United States Patent
Hasegawa et al.

(10) Patent No.: US 6,554,085 B2
(45) Date of Patent: Apr. 29, 2003

(54) MULTI-WHEEL VEHICLE WITH TRANSMISSION FOR DRIVING-STEERING

(75) Inventors: Toshiyuki Hasegawa, Amagasaki (JP); Koji Irikura, Amagasaki (JP); Hiroaki Shimizu, Amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 35 days.

(21) Appl. No.: 09/820,673

(22) Filed: Mar. 30, 2001

(65) Prior Publication Data

US 2001/0040057 A1 Nov. 15, 2001

Related U.S. Application Data

(63) Continuation-in-part of application No. 09/372,747, filed on Aug. 11, 1999, now Pat. No. 6,336,513.

(30) Foreign Application Priority Data

Mar. 12, 1998 (JP) .......................................... 10-344319

(51) Int. Cl.⁷ .......................... B60K 17/30; B62D 11/02
(52) U.S. Cl. ..................................... 180/6.26; 180/6.66
(58) Field of Search ........................... 180/6.2, 6.24, 180/6.26, 6.44, 6.32, 6.62, 6.66, 24.12, 251

(56) References Cited

U.S. PATENT DOCUMENTS

| | | |
|---|---|---|
| 2,191,961 A | 2/1940 | Howell |
| 2,255,348 A | 9/1941 | Brown |
| 2,311,922 A | 2/1943 | Allin |
| 2,332,838 A | 10/1943 | Borgward |
| 2,336,911 A | 12/1943 | Zimmermann |
| 2,336,912 A | 12/1943 | Zimmermann |
| 2,391,735 A | 12/1945 | Orshansky, Jr. |
| 2,530,720 A | 11/1950 | Paulson |
| 2,745,506 A | 5/1956 | McCallum |
| 2,763,164 A | 9/1956 | Neklutin |

(List continued on next page.)

FOREIGN PATENT DOCUMENTS

| | | |
|---|---|---|
| CH | 249274 | 4/1948 |
| DE | 4224887 A | 9/1993 |

(List continued on next page.)

OTHER PUBLICATIONS

Brochure Regarding Differential Steering, pp. 4–15.
Excel Industries, Inc. "Hustler 4000 Series", 1995, pp. 1–8.

(List continued on next page.)

*Primary Examiner*—Brian L. Johnson
*Assistant Examiner*—Gerald B Klebe
(74) *Attorney, Agent, or Firm*—Sterne, Kessler, Goldstein & Fox P.L.L.C.

(57) ABSTRACT

A multi-wheel vehicle provided with at least six running wheels, that is, a pair of first running wheels serving as driving wheels, a pair of second running wheels such as castors disposed before or behind said pair of first running wheels so as to be laterally turned in the traveling direction of said vehicle, and a pair of third running wheels disposed before or behind said first running wheels. The vehicle comprises a prime mover, a speed change operation device, a steering operation device, a transmission drivingly connected with said prime mover, and a pair of running-driving axles onto which said respective first running wheels are attached. The transmission applies composite force of first equal rotational forces in the same directions and second equal rotational forces in opposite directions onto said pair of first running wheels. The speed change operation device is manipulated so as to regulate the direction and magnitude of said first rotational forces. The steering operation device is manipulated so as to regulate the direction and magnitude of said second rotational forces.

15 Claims, 20 Drawing Sheets

U.S. PATENT DOCUMENTS

| | | | |
|---|---|---|---|
| 2,936,033 A | 5/1960 | Gates | |
| 3,059,416 A | 10/1962 | Campbell | |
| 3,371,734 A | 3/1968 | Zaunberger et al. | |
| 3,376,760 A | 4/1968 | Gordanier | |
| 3,395,671 A | 8/1968 | Zimmerman, Jr. | |
| 3,450,218 A | 6/1969 | Looker | |
| 3,492,891 A | 2/1970 | Livezey | |
| 3,530,741 A | 9/1970 | Charest | |
| 3,590,658 A | 7/1971 | Tuck | |
| 3,596,535 A | 8/1971 | Polak | |
| 3,603,176 A | 9/1971 | Tipping | |
| 3,612,199 A | 10/1971 | Vissers | |
| 3,717,212 A | 2/1973 | Potter | |
| 3,901,339 A | 8/1975 | Williamson | |
| 3,903,977 A | 9/1975 | Gillette et al. | |
| 3,907,051 A | 9/1975 | Weant et al. | |
| 3,978,937 A | 9/1976 | Chichester et al. | |
| 4,133,404 A | 1/1979 | Griffin | |
| 4,174,762 A | 11/1979 | Hopkins et al. | |
| 4,245,524 A | 1/1981 | Dammon | |
| 4,281,737 A | 8/1981 | Molzahn | |
| 4,320,810 A | 3/1982 | Hillmann et al. | |
| 4,399,882 A | 8/1983 | O'Neill et al. | |
| 4,471,669 A | 9/1984 | Seaberg | |
| 4,577,711 A | 3/1986 | Butler | |
| 4,718,508 A | 1/1988 | Tervola | |
| 4,729,257 A | 3/1988 | Nelson | |
| 4,732,053 A | 3/1988 | Gleasman et al. | |
| 4,738,328 A | 4/1988 | Hayden | |
| 4,776,235 A | 10/1988 | Gleasman et al. | |
| 4,776,236 A | 10/1988 | Gleasman et al. | |
| 4,782,650 A | 11/1988 | Walker | |
| 4,790,399 A | 12/1988 | Middlesworth | |
| 4,809,796 A | 3/1989 | Yamaoka et al. | |
| 4,813,506 A | 3/1989 | Smith | |
| 4,875,536 A | 10/1989 | Saur et al. | |
| 4,882,947 A | 11/1989 | Barnard | |
| 4,890,508 A * | 1/1990 | Zaunberger | 74/687 |
| 4,895,052 A | 1/1990 | Gleasman et al. | |
| 4,917,200 A | 4/1990 | Lucius | |
| 4,949,823 A | 8/1990 | Coutant et al. | |
| 5,004,060 A | 4/1991 | Barbagli et al. | |
| 5,015,221 A | 5/1991 | Smith | |
| 5,052,511 A | 10/1991 | Hunt | |
| 5,094,326 A | 3/1992 | Schemelin et al. | |
| 5,131,483 A | 7/1992 | Parkes | |
| RE34,057 E | 9/1992 | Middlesworth | |
| 5,195,600 A | 3/1993 | Dorgan | |
| 5,279,376 A | 1/1994 | Yang et al. | |
| 5,285,866 A | 2/1994 | Ackroyd | |
| 5,307,612 A | 5/1994 | Tomiyama et al. | |
| 5,335,739 A | 8/1994 | Pieterse et al. | |
| 5,339,631 A | 8/1994 | Ohashi | |
| 5,383,528 A | 1/1995 | Nicol | |
| 5,387,161 A | 2/1995 | Shibahata | |
| 5,505,279 A | 4/1996 | Louis et al. | |
| 5,507,138 A | 4/1996 | Wright et al. | |
| 5,517,809 A | 5/1996 | Rich | |
| 5,535,840 A | 7/1996 | Ishino et al. | |
| 5,553,453 A | 9/1996 | Coutant et al. | |
| 5,560,447 A | 10/1996 | Ishii et al. | |
| 5,564,518 A | 10/1996 | Ishii et al. | |
| 5,644,903 A | 7/1997 | Davis, Jr. | |
| 5,649,606 A | 7/1997 | Beberness et al. | |
| 5,667,032 A | 9/1997 | Kamlukin | |
| 5,706,907 A | 1/1998 | Unruh | |
| 5,722,501 A | 3/1998 | Finch et al. | |
| 5,842,378 A | 12/1998 | Zellmer | |
| 5,850,886 A | 12/1998 | Kouno et al. | |
| 5,894,907 A | 4/1999 | Peter | |
| 5,910,060 A | 6/1999 | Blume | |
| 5,913,802 A | 6/1999 | Mullett et al. | |
| 5,946,894 A | 9/1999 | Eavenson et al. | |
| 5,947,219 A | 9/1999 | Peter et al. | |
| 5,975,224 A | 11/1999 | Satzler | |
| 5,997,425 A | 12/1999 | Coutant et al. | |
| 6,026,634 A | 2/2000 | Peter et al. | |
| 6,029,761 A * | 2/2000 | Gustafson et al. | 180/6.2 |
| 6,035,959 A | 3/2000 | Schaedler | |
| 6,038,840 A | 3/2000 | Ishimori et al. | |
| 6,098,737 A | 8/2000 | Aoki | |
| 6,126,564 A | 10/2000 | Irikura et al. | |
| 6,129,164 A | 10/2000 | Teal et al. | |
| 6,141,947 A | 11/2000 | Borling | |
| 6,189,641 B1 | 2/2001 | Azuma | |
| 6,276,468 B1 * | 8/2001 | Essig et al. | 180/6.2 |
| 6,354,388 B1 * | 3/2002 | Teal et al. | 180/6.2 |
| 6,454,032 B1 * | 9/2002 | Teal et al. | 180/6.62 |
| 6,478,706 B1 * | 11/2002 | Crabb | 475/18 |

FOREIGN PATENT DOCUMENTS

| | | | |
|---|---|---|---|
| EP | 0 806 337 A1 | 11/1997 | |
| FR | 1 147 142 | 10/1960 | |
| GB | 2 303 829 | 3/1997 | |
| JP | 57-140277 | 8/1982 | |
| JP | 63227476 | 9/1988 | |
| JP | 401160783 A * | 6/1989 | 108/6.2 |
| JP | 2-261952 | 10/1990 | |
| JP | 6-264976 | 9/1994 | |
| JP | 08 142906 | 6/1996 | |
| JP | 09 202255 | 8/1997 | |
| JP | 09 202258 | 8/1997 | |
| JP | 09 202259 | 8/1997 | |
| JP | 9-216522 | 8/1997 | |
| WO | 92/12889 | 8/1992 | |
| WO | WO 98/32645 | 7/1998 | |
| WO | 99/40499 | 8/1999 | |
| WO | WO 00/01569 | 1/2000 | |

OTHER PUBLICATIONS

Michael Bargo, Jr., "Tanks and dozers turn on a dime with new all gear steering", Popular Science, Jul. 1985, pp. 60–62.

R.M. Ogorkiewicz, "Tank Steering Mechanisms", *The Engineer*, Mar. 3, 1967, pp. 337–340.

Excel Industries, Inc. "U–T–R The Ultimate Turning Radius", 1992, pp. 1–6.

Electric Tractor Corporation, "An Idea Whose Time Has Come", 5 pages, date of publication unknown, published in Ontario, Canada.

Electric Tractor Corporation, Model #9620, "The Ultimate Lawn and Garden Tractor", 6 pages, date of publication unknown.

Farm Show Magazine, "Battery Powered Riding Mower", 1 page, date of publication, Mar.–Apr. 1996.

Deere & Company, "240, 245, 260, 265, 285 and 320 Lawn and Garden Tractors Technical Manual", front cover and pages 10–2 to 10–4 and 10–6, date of publication, 1996.

U.S. application No. 09/700,147, filed Nov. 13, 2000, entitled Driving Apparatus for Speed Changing and Steering of a Vehicle. (0666.1110000).

U.S. application No. 09/700,923, filed Nov. 21, 2000, entitled Transmission for Speed Changing and Steering of a Vehicle. (0666.1150000).

U.S. application No. 09/642,147, filed Aug. 21, 2000, entitled Axle Driving Apparatus. (0666.1340001).

U.S. application No. 09/489,680, filed Jan. 24, 2000, entitled Vehicle Improved in Steering. (0666.1400000).

U.S. application No. 09/489,678, filed Jan. 24, 2000, entitled Integral Hydrostatic Transaxle Apparatus for Driving and Steering. (0666.1420000).

U.S. application No. 09/622,414, filed Aug. 16, 2000, entitled Integral–type Hydraulic and Mechanical Transaxle Apparatus for Driving and Steering a Vehicle. (0666.1520000).

Woods Equipment Company, "Woods Mow'n Machine, Zero turning radius riding mower", 12 pages, 1997.

ExMark "Professional turf care equipment", 20 pages, 1997.

Dixon Industries, Inc., "Dixon ZTR Riding Mowers", pp. 1–4, 1997.

Shivvers, Mfg., "Zero turn radius mower, The Commercial Clipper", pp. 1–4, 1997.

Ferris Industries, Inc., "The ProCut Z Zero Turn Rider", pp. 1–2, 1997.

Zipper, TS Mower, "The Zipper–TS Mowers" pp. 1–2, 1997.

Westwood, "The Westwood Clipper, Owner's Instruction Manual", pp. 1–17, 19, date of publication unknown.

* cited by examiner

US 6,554,085 B2

MULTI-WHEEL VEHICLE WITH TRANSMISSION FOR DRIVING-STEERING

REFERENCE TO RELATED APPLICATION

This application is a Continuation-in-Part of application Ser. No. 09/372,747; filed Aug. 11, 1999, now U.S. Pat. No. 6,336,513 B1, published Jan. 8, 2002 the disclosure of which is incorporated in its entirely by reference hereto.

BACKGROUND OF THE INVENTION

Conventionally, technology where a pair of hydrostatic transmissions (HSTs) are laterally connected, driving axles project laterally from respective HSTs, running-driving wheels are fixed to the outer ends of both axles, wherein movable swash plates as capacity adjusting members for the hydraulic pumps of the HSTs are individually changed in angle thereby driving the left and right running wheels individually, is well-known, as disclosed in, for example, the U.S. Pat. No. 4,782,650.

In such construction, running speeds of the left and right HSTs, when the vehicle is driven straight forward, are equalized, and, when turned, are different.

The above-said vehicle, however, could not travel straight-forward unless the output rotations of left and right HSTs completely coincided with each other, adjustments in shipment took much time, and parts and assembly errors had to be diminished so as to improve accuracy. Also, when there was a difference between the capacities of hydraulic pumps and motors, left or right turning feeling of the vehicle was different, resulting in that the vehicle was very hard to steer.

Also, the same vehicle was larger in turning radius due to its lateral arrangement of the pair of HSTs, so that the vehicle had to run in the same place many times for such work as lown-mowing around trees, thereby deteriorating the working efficiency.

Thus, for overcoming the above problems, a vehicle including a steering operation means; a pair of running-driving axles; a pair of running wheels drivingly connected with the pair of running-driving axles; a first differential unit interposed between the pair of running-driving axles; a first hydrostatic transmission for transmitting a driving force to the first differential unit; a pair of steering output shafts; a second differential unit interposed between the pair of steering output shafts; a second hydrostatic transmission for transmitting a driving force to the second differential unit; a first drive train interposed between one of the steering output shafts and one of the running-driving axles, and a second drive train interposed between the other steering output shaft and the other running-driving axle for transmitting the rotating effort to the other running-driving axle in the opposite direction to the first drive train, wherein the second hydrostatic transmission operationally interlocks with the steering operation means so that the output speed and direction of the second hydraulic transmission is changed by manipulation of the steering operation means, has come to be invented. The vehicle does not require such labor as above mentioned for precise coincidence between the capacities of the first and second hydrostatic pumps and motors. Also, when both the hydrostatic pumps and motors are arranged in a longitudinal line, the vehicle becomes laterally compact, thereby diminishing the turning radius.

However, it is still desirable to improve the running efficiency of the vehicle when it is driven on a rough road or a soft ground. Also, when such a vehicle has a plurality of running wheels arranged in a longitudinal direction so as to be made larger in whole length, it is still difficult to diminish the turning radius of the vehicle only by changing the number of rotations of the left and right running-driving wheels.

FIELD OF THE INVENTION

The present invention relates to a vehicle comprising at least six running wheels and a transmission which, when a steering operation means is manipulated, differentially drives a pair of running-driving axles so as to make a vehicle turn left and right.

SUMMARY OF THE INVENTION

An object of the present invention is to provide a vehicle improved in its running efficiency on rough or soft ground and in its turning on a small circle, wherein a transmission drivingly connected with a prime mover applies composite force of equal first rotational forces in the same directions and equal second rotational forces in the opposite directions onto a pair of running-driving axles differentially connected with each other. A speed change operation means and a steering operation means are manipulated so as to regulate the directions and magnitudes of the first rotational forces and the second rotational forces respectively.

To attain the object, the vehicle of the present invention comprises at least six running wheels, i.e., a pair of first running wheels serving as running-driving wheels attached onto respective running-driving axles, a pair of second running wheels disposed before or behind the pair of first running wheels so as to be laterally turnable into the running direction of the vehicle, and a pair of third running wheels disposed before or behind the pair of first running wheels.

Especially, the pair of second running wheels may be castors so as to secure a reduced turning circle for the vehicle.

Furthermore, the pair of third running wheels may be castors.

Also, the pair of third running wheels may be attached to a pair of second axles disposed in parallel to the pair of first running-driving axles. In this case, the driving force of the first running-driving axles may be transmitted to the second axles. Especially, the running-driven axles may be driven through a pair of power transmission mechanisms interposed between the respective running-driving axles and the respective second axles so as to rotate the pair of second axles in the same rotational direction of the running-driving axles, thereby enhancing the running efficiency on rough or soft ground.

These and other objects of the invention will become more apparent in the detailed description and examples which follow.

DETAILED DESCRIPTION OF A PREFERRED EMBODIMENT OF THE INVENTION

An axle driving/steering unit 10 for the present invention can make its left and right running-driving wheels different in their rotary speeds so as to turn a vehicle using it leftward and rightward. It comprises a first running hydrostatic transmission (to be herein after called "a main driving HST") 21 as a hydraulic pump and motor fluidly connected with each other, a second steering hydrostatic transmission (to be herein after called "a steering HST") 22 as a hydraulic pump and motor fluidly connected with each other, a steering differential unit (a second differential unit) 23 for steering the vehicle, and a running differential unit (first differential unit) 24 for running-driving the vehicle. Differential units 23 and 24 are either of a type as a combination of planetary gears and bevel gears or of a type as a combination of a pair of differential gears.

Figure 1:
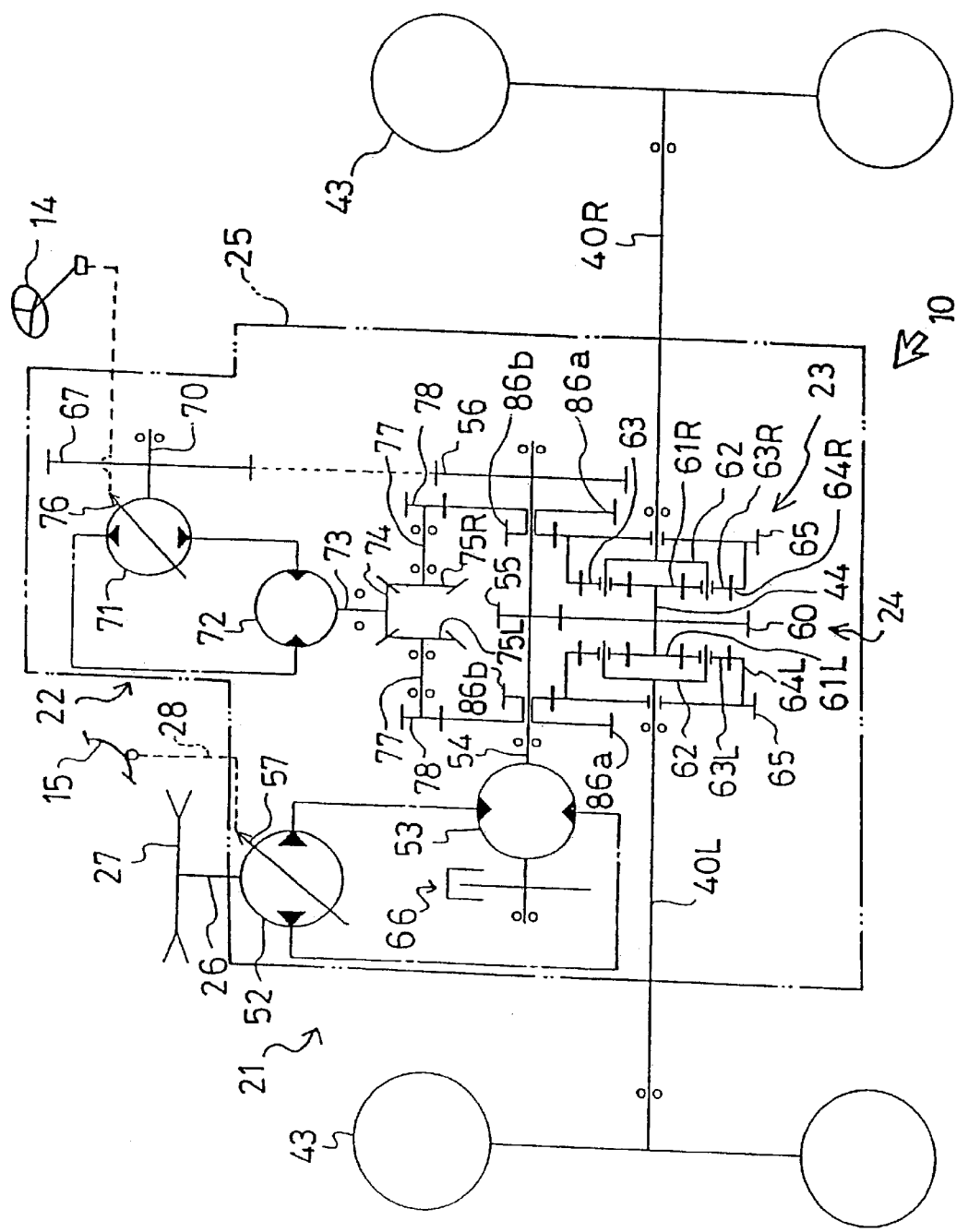
FIG. 1 is a schematic diagram of an axle driving/steering unit 10 for the present invention.

Referring to FIG. 1 showing axle driving/steering unit 10 using planetary gears and bevel gears, main driving HST 21 comprises a variable displacement hydraulic pump 52 and a fixed displacement hydraulic motor 53, as is well-known. An input shaft 26 as a pump shaft of hydraulic pump 52 projects from a housing 25 and a driving force is transmitted from an engine 11 through a belt 30 to an input pulley 27 provided on input shaft 26 (refer to FIGS. 3–20 showing various embodiments of a multi-axle vehicle having axle driving/steering unit 10, except for some figures from which engine 11, belt 30 and the like are omitted for convenience).

Hydraulic pump 52 and hydraulic motor 53 are fluidly connected with each other by a closed circuit formed in a center section.

A movable swash plate 57, used as means for changing a discharge amount and a discharge direction of hydraulic oil from hydraulic pump 52, is connected with a control shaft. The control shaft is connected through a connecting means 28 like an arm or a link disposed outside housing 25 with a speed change oprtaion means like a lever or a pedal (in this embodiment, a speed change pedal 15) provided on a vehicle. Speed change pedal 15 is pivotally supported at the center thereof onto the vehicle body. When pedal 15 is trod at the front portion, the vehicle runs forwardly and is accelerated in proportion to its treading amount. When trod at the rear portion, the vehicle is driven rearwardly.

Speed change pedal 15 is rotated to tilt movable swash plate 57 so as to change the discharge direction and discharge amount of hydraulic oil from hydraulic pump 52, thereby changing the running speed.

Pressure oil from hydraulic pump 52 is sent to hydraulic motor 53 through an oil passage in the center section so as to drive a motor shaft 54. A braking unit 66 is disposed on one side of motor shaft 54, which is an output shaft of hydraulic motor 53. Onto the other side are fixed a running-driving gear 55 and a steering power take-off gear 56. Running-driving gear 55 engages with a center gear 60 fixed onto a shaft 44 disposed between driving axles 40L and 40R and coaxially therewith. On both sides of shaft 44 are fixed sun gears 61L and 61R, which engage at the outer peripheries thereof with planetary gears 63 pivotally supported onto carriers 62 fixed to the inner ends of running-driving axles 40L and 40R. Internal gears 64L and 64R engage with planetary gears 63 around sun gears 61L and 61R. Large diameter gears 65 integrally fixed with internal gears 64L and 64R are freely fitted onto running-driving shafts 40L and 40R outside carriers 62. Thus, running differential unit 24 of a running-driving system is constructed.

Steering power take-off gear 56 engages with an input gear 67 for steering HST 22, input gear 67 being fixed on an input shaft 70 serving as a pump shaft for a hydraulic pump 71 of steering HST 22. Steering HST 22 comprises a variable displacement hydraulic pump 71 and a fixed displacement hydraulic motor 72 and is mounted onto the center section fixed into housing 25. Both pump 71 and motor 72 are fluidly connected with each other through oil passages in the center section. A movable swash plate 76 of hydraulic pump 71 is interlockingly connected through an arm 139 and a connection link 160 (refer to FIGS. 3–20) with a steering wheel 14 serving as a steering operation means provided on the vehicle, and tilts correspondingly to a rotation of steering wheel 14. Movable swash plate 76 tilts to change the discharge direction and discharge amount of pressure oil from hydraulic pump 71 so as to enable motor shaft 73 of hydraulic motor 72 to be changed in the direction and number of rotations thereof.

A bevel gear 74 is fixed at the upper end of motor shaft 73 of hydraulic motor 72. A pair of side bevel gears 75L and 75R, disposed in opposite to each other, engage with bevel gear 74 so as to be rotated reversely to each other. Small diameter gears 78 are fixed onto the outer ends of a pair of steering output shafts 77 on which side bevel gears 75L and 75R are fixedly supported, and engage with large diameter gears 86a of twin gears 86 free-fitted onto motor shaft 54. Small diameter gears 86b of twin gears 86 engage with large diameter gears 65, respectively, so as to transmit the driving force to steering differential unit 23.

In the above-mentioned construction, input shaft 26 is always driven in the state that engine 11 is driven. When steering wheel 14 is put in the straight forward running direction, steering HST 22 is in neutral and motor shaft 73 of hydraulic motor 72 is not driven, so that speed change pedal 15 is trod at the front or the rear to turn movable swash plate 57 for hydraulic pump 52 of main driving HST 21, thereby driving hydraulic motor 53, whereby left and right running-driving axles 40L and 40R are driven in an equal number of rotations through motor shaft 54, running-driving gear 55, center gear 60 and running differential unit 24, and the vehicle is straight forwardly or rearwardly driven. In the state of forwardly or rearwardly driving, hydraulic pump 71 of steering HST 22 is driven from motor shaft 54 through gears 56 and 67 in proportion to the running speed, thereby enabling the steering feeling corresponding thereto to be obtained by the operation as described later.

When steering wheel 14 is rotated in the straight forward running state, movable swash plate 76 of steering HST 22 is turned to drive hydraulic motor 72. For example, when steering wheel 14 is rightwardly turned, hydraulic pump 71 is actuated so as to drive hydraulic motor 72, so that the driving force from motor shaft 73 is transmitted to left and right side bevel gears 75L and 75R through bevel gear 74 in a manner that one of side bevel gears 75L and 75R is normally rotated and the other is reversely rotated in an equal numbers of rotations, and furthermore the driving force is transmitted to internal gears 64L and 64R through small diameter gears 78 and twin gears 86. The speed of normal rotation of internal gear 64L is added to that of normal revolution of planetary gears 63L normally rotating around sun gear 61L and the speed of reverse rotation of internal gear 64R is deducted from that of normal revolution of planetary gears 63R around sun gear 61R.

Thus, keeping the driving state of both running-driving axles 40L and 40R, the number of rotations of driving axle 40L becomes larger than that of driving axle 40R, thereby rightwardly turning the course of the vehicle.

A discharge amount of oil from hydraulic pump 71 increases accordingly as the turning angle of steering wheel 14 becomes larger, and correspondingly, the rotary speed of hydraulic motor 72 increases in a stepless manner, so that a difference of rotary speeds between left and right running-driving axles 40L and 40R gradually increases, thereby enabling the vehicle to be turned further in a smaller radius.

Conversely, when steering wheel 14 is leftwardly turned, movable swash plate 76 of steering HST 22 is tilted in the reverse direction to the above-mentioned, whereby the output rotation direction of hydraulic motor 72 becomes reversed so as to leftwardly turn the vehicle in the reverse direction to the above-mentioned case.

In a case when speed change pedal 15 is trod at the rear to rearwardly drive the vehicle, speed change pedal 15 is rearwardly turned to turn movable swash plate 57 reversely to the above-mentioned so as to rotate motor shaft 54 reversely to its rotational direction for forward movement, thereby driving the vehicle rearwardly. In the case of rearwardly running of the vehicle, when steering wheel 14 is rightwardly rotated to tilt movable swash plate 76, hydraulic motor 72 and motor shaft 73 are rotated reversely to their rotational direction in the same case when the vehicle runs forwardly because of the reverse rotation of input shaft 70 of steering hydraulic pump 71. Thus, left side bevel gear 75L is rotated reversely so that its rotary speed is added to the speed of the reverse revolution of left planetary gears 63L, and right side bevel gear 75R is rotated normally so that its rotary speed is deducted from the speed of reverse revolution of right planetary gears 63R, whereby the vehicle can rightwardly turn while rearwardly moving. Conversely, the vehicle, while rearwardly moving, can be turned leftwardly by rotating steering wheel 14 leftwardly.

Accordingly, the vehicle, even when rearwardly driven, can turn corresponding to the rotating direction of steering wheel 14 so as to be driven in the same feeling as an an automobile. When speed change pedal 15 is in a neutral position, i.e., when the vehicle stops, hydraulic motor 53 is not driven, whereby steering hydraulic pump 71 is not driven, so that, even when steering wheel 14 is rotated, hydraulic motor 72 is not driven and the vehicle does not travel. Hence, even when the operator who gets in and out of a driver's seat in the vehicle touches steering wheel 14, the vehicle remains stationary, thereby ensuring safety.

Figure 2:
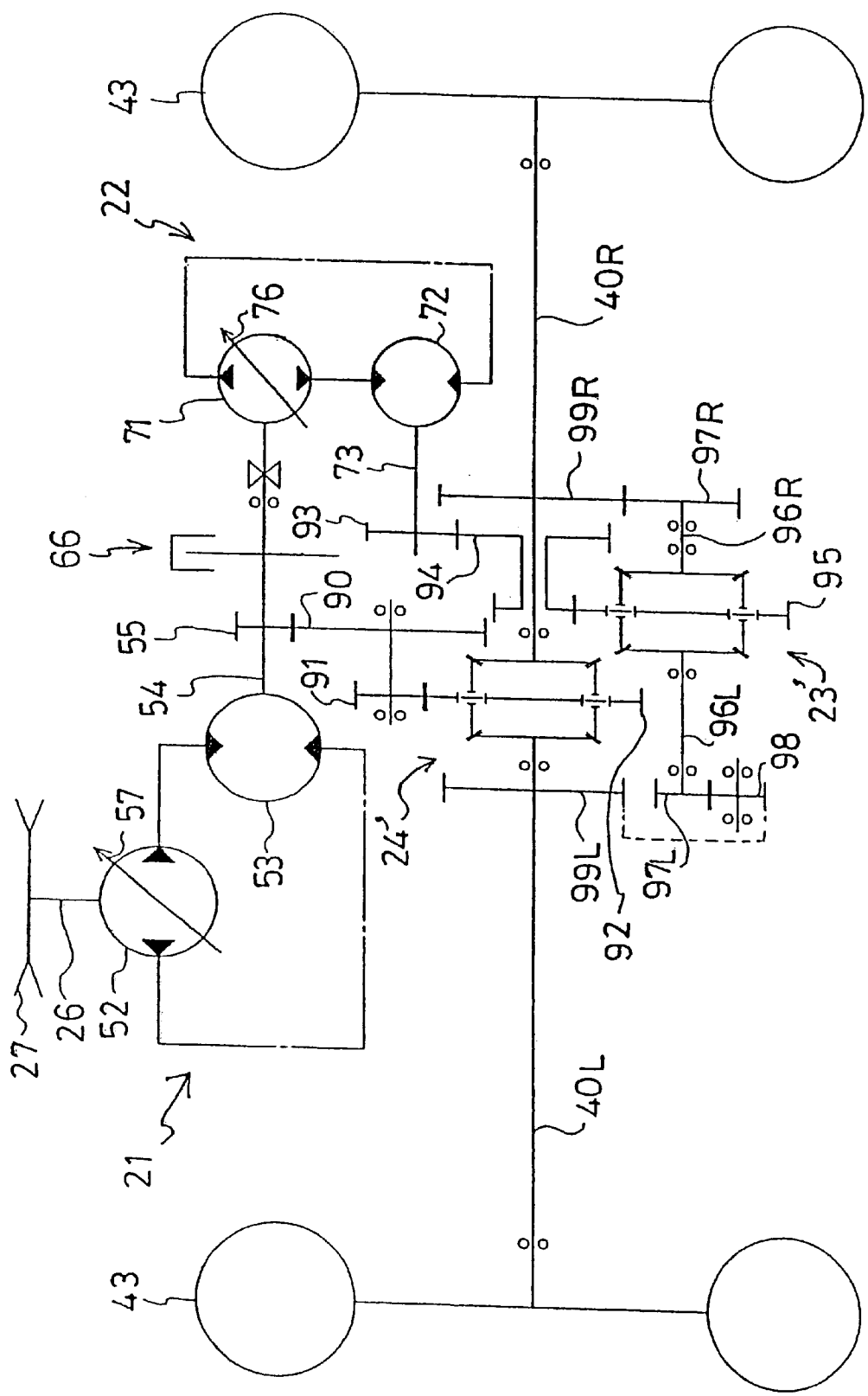
FIG. 2 is a schematic diagram showing a modified embodiment of axle driving/steering unit 10 of FIG. 1.

The steering differential unit and the running differential unit may, as shown in FIG. 2, comprise both the differential gears. In this case, the input shaft of steering HST 22 is directly connected onto motor shaft 54 of main driving HST 21, and running-driving gear 55 fixed onto motor shaft 54 transmits the driving force to differential ring gear 92 of running differential unit 24' through gears 90 and 91. On motor shaft 73 of steering HST 22 is fixed a spur gear 93, from which the driving force is transmitted to differential ring gear 95 of a steering differential unit 23' through twin gears 94 fitted on right running-driving axle 40R. On the one hand, the driving force is transmitted through a reversing gear 98 from a left differential output gear 97L fixed onto left steering output shaft 96L of steering differential unit 23' to a gear 99L fixed onto left running-driving axle 40L, and on the other hand, the driving force is transmitted from a right differential output gear 97R fixed onto a right steering output shaft 96R of steering differential unit 23' to a gear 99R fixed onto right running-driving axle 40R.

Thus, as the same as above-mentioned, when steering wheel 14 is rightwardly turned, the normally rotational driving force is transmitted to left gear 99L, and when steering wheel 14 is leftwardly turned, the normal rotational driving force is transmitted to right gear 99R.

However, it is possible to transmit the driving force by sprockets and chains instead of gears 97L, 97R and 99L, 99R. Also, it is possible that main driving HST 21 and running differential unit 24' and housed in one housing so as to be interlockingly connected, steering HST 22 and steering differential unit 23 are housed in another housing so as to be interlockingly connected, and the output rotation from steering differential unit 23' is laterally and reversely transmitted to the output shafts (driving axles 40L and 40R) of running differential unit 24.

Figure 3:
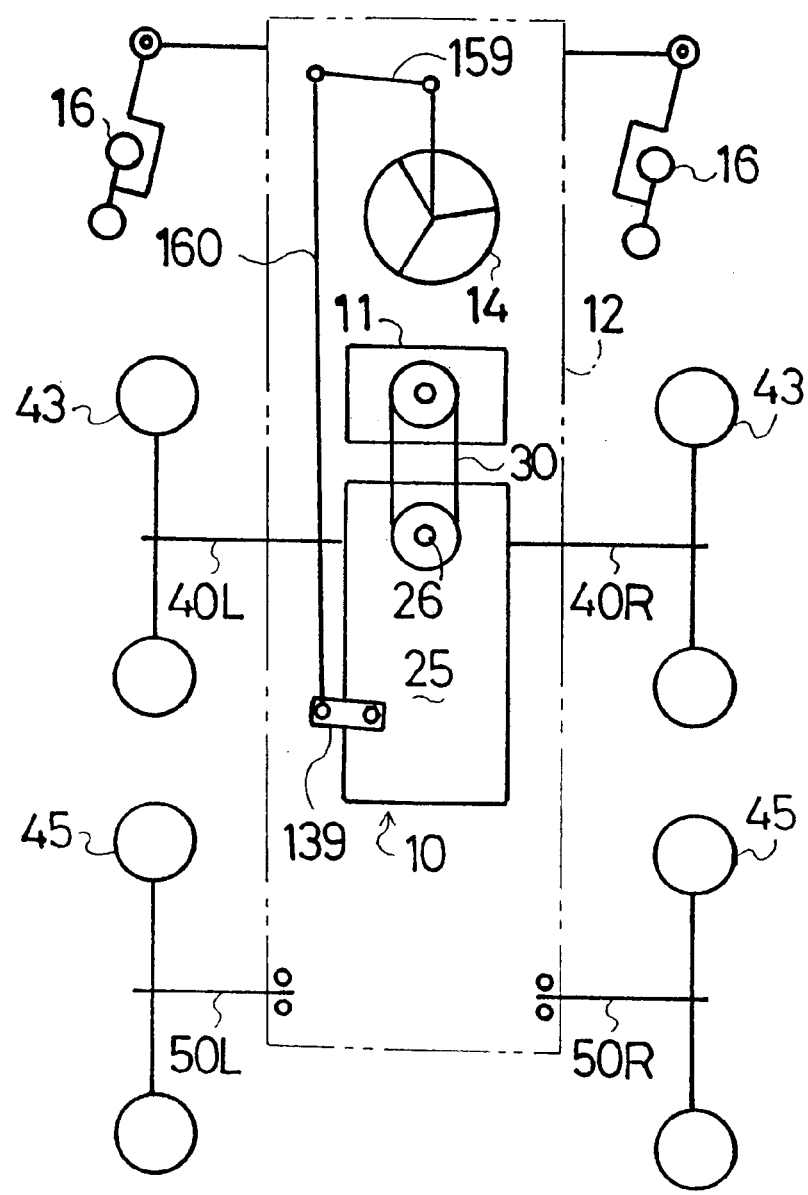
FIG. 3 is a schematic view of a six-wheel vehicle having first wheels 43 driven by axle driving/steering unit 10, castors 16 and third wheels 45 as a multi-axle vehicle according to the present invention.

For application of axle driving/steering unit 10 to a vehicle, as shown in FIG. 3 and others, running-driving axles 40L and 40R are journalled by a vehicle chassis 12. Firstly, as shown in FIG. 1 and others, it is conceivable that a pair of first running wheels 43 are fixed onto outer ends of respective axles 40L and 40R. As shown in FIG. 3 and others, the steering operation means (steering wheel 14) is connected to an arm 139 for rotating movable swash plate 76 of steering HST 22 through gears in a steering gear box (not shown), a pitman arm 159 and a connection link 160. In the gear box are housed reduction gears of conventional rack-and-pinion type or worm gear type, for converting the rotational motion of steering wheel 14 into linear motion of pitman arm 159.

To further reduce the turning radius of a vehicle including running-driving wheels which can be differentially driven by axle driving/steering system 10 interlocked with the steering operation tool (steering wheel 14), at least one castor, for example, may be additionally provided on the vehicle before or behind first running wheels 43 for serving as a second running wheel which is laterally turned into the running direction of the vehicle. In each of FIGS. 3 and 4, a pair of castors 16 are provided. In FIG. 3, castors 16 are disposed before first running wheels 43, and in FIG. 4, they are behind first running wheels 43.

However, when the vehicle parks on a slope along the contour line thereof, vehicle weight acts to turn the castors in the tilting direction, whereby the vehicle body forwardly tilts down.

Figure 4:
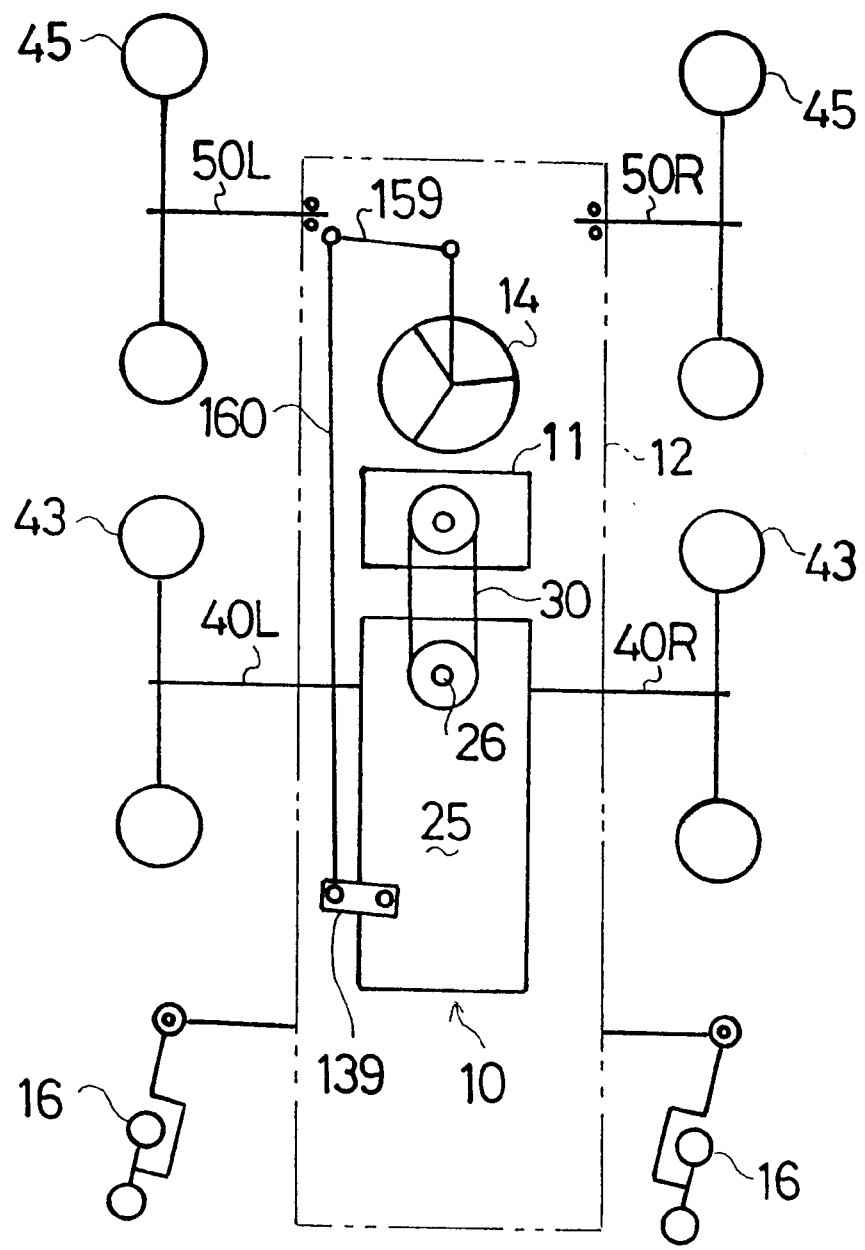
FIG. 4 is a schematic view of the six-wheel vehicle of FIG. 3, wherein castors 16 and third wheels 45 are exchanged with each other.

Therefore, in each of FIGS. 3 and 4, for increasing the gripping force against the ground surface, in addition to castors 16, a pair of third running wheels 45 are fixed onto outer ends of respective second axles 50L and 50R journalled by vehicle chassis 12 in parallel to running-driving axles 43 and either before or behind first running wheels 43. Incidentally, castors 16 are disposed oppositely to third running wheels 45 with respect to first running wheels 43. In FIG. 3, third running wheels 45 are behind first running wheels 43, and in FIG. 4, they are before.

Accordingly, the vehicle of each of FIGS. 3 and 4 is a six-wheel vehicle, wherein the pair of castors 16 are laterally turned into the running direction of the vehicle in addition to the difference of rotary speed between left and right first running wheels 43 during the steering of the vehicle so as to further reduce the turning radius of the vehicle, and on the other hand, the pair of third wheels 46 are provided so as to increase the traveling stability of the vehicle.

However, the castor is hard to be viewed by the operator because it is disposed under a floor of the vehicle; and the castor is independent of. steering wheel 14, whereby, in the state where the vehicle stops, it is difficult to distinguish which direction the castors are in.

For example, in a case when the castor stops while leftwardly turning, then the vehicle starts while steering wheel 14 is rightwardly turned, the castors may instantaneously be turned from the left side to the right side, whereby the vehicle, for a moment, moves in the direction of a letter S, resulting in the operator being misguided.

In order to solve the problem, steerable wheels whose lateral turning depends upon the manipulation of steering wheel 14 may be considerably provided.

Figure 5:
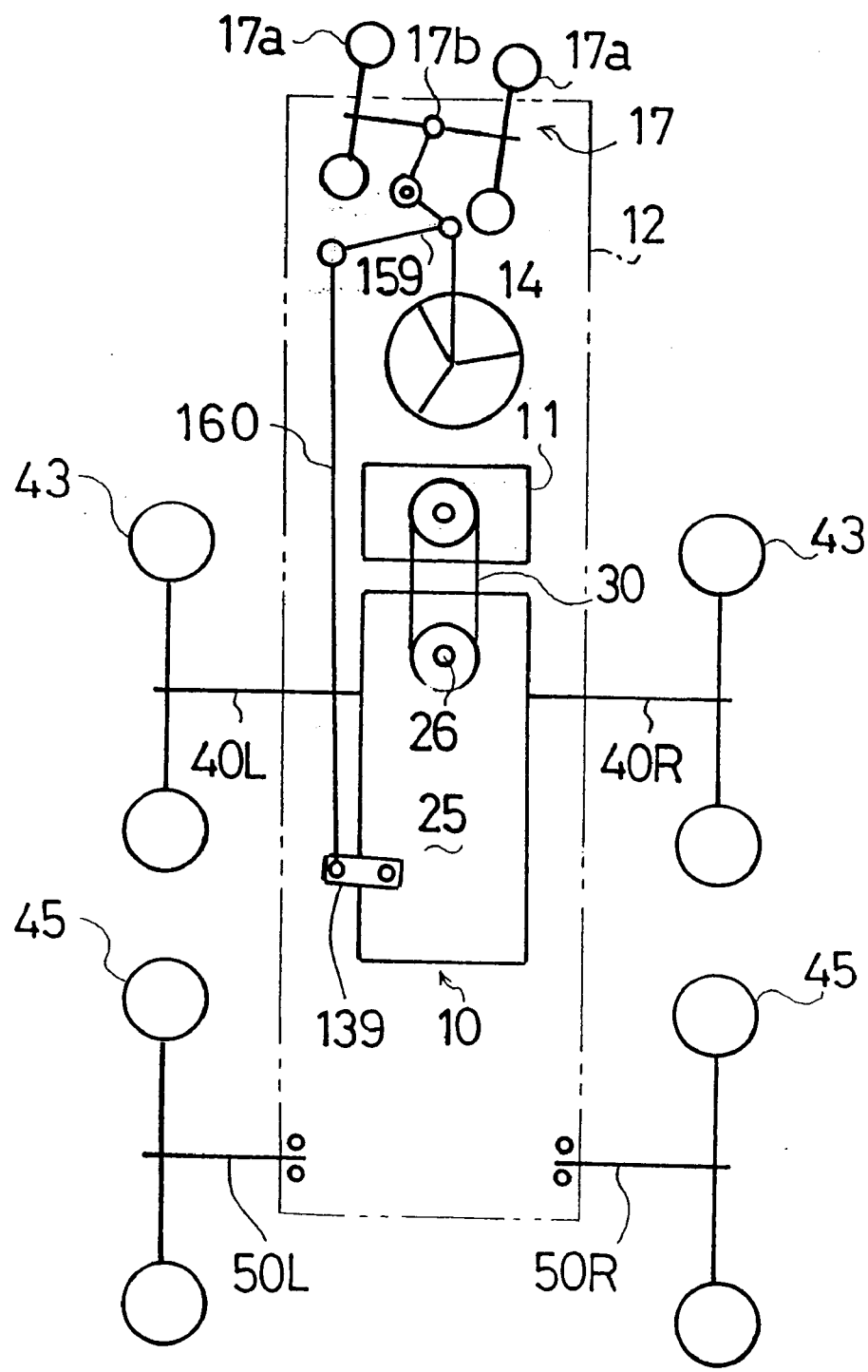
FIG. 5 is a schematic view of the six-wheel vehicle of FIG. 3, wherein steerable wheel structure 17 replaces castors 16.

Referring to FIG. 5, instead of castors 16, a steerable wheel structure 17 is disposed in the lateral middle of the front portion of the vehicle of FIG. 3.

The steerable wheel structure 17 comprises a pair of steerable wheels 17a and a lateral-rotation pivot 17b arranged between the pair of steerable wheels 17a, similarly with the structure of a nose landing gear of a long-range jet. Lateral-rotation pivot 17b is connected with steering wheel 14 through a linkage, an actuator and the like so as to be rotated by the manipulation of steering wheel 14, thereby laterally turning the pair of steerable wheels 17a. This structure is advantageous in reduction of the turning radius similarly with a single castor 16 provided on the lateral middle portion of the vehicle. However, the pair of steerable wheels 17a have a greater gripping force than the single castor 16. Furthermore, the direction of steerable wheels 17a can be recognized by viewing the position of steering wheel 14, thereby solving the above problem.

Figure 6:
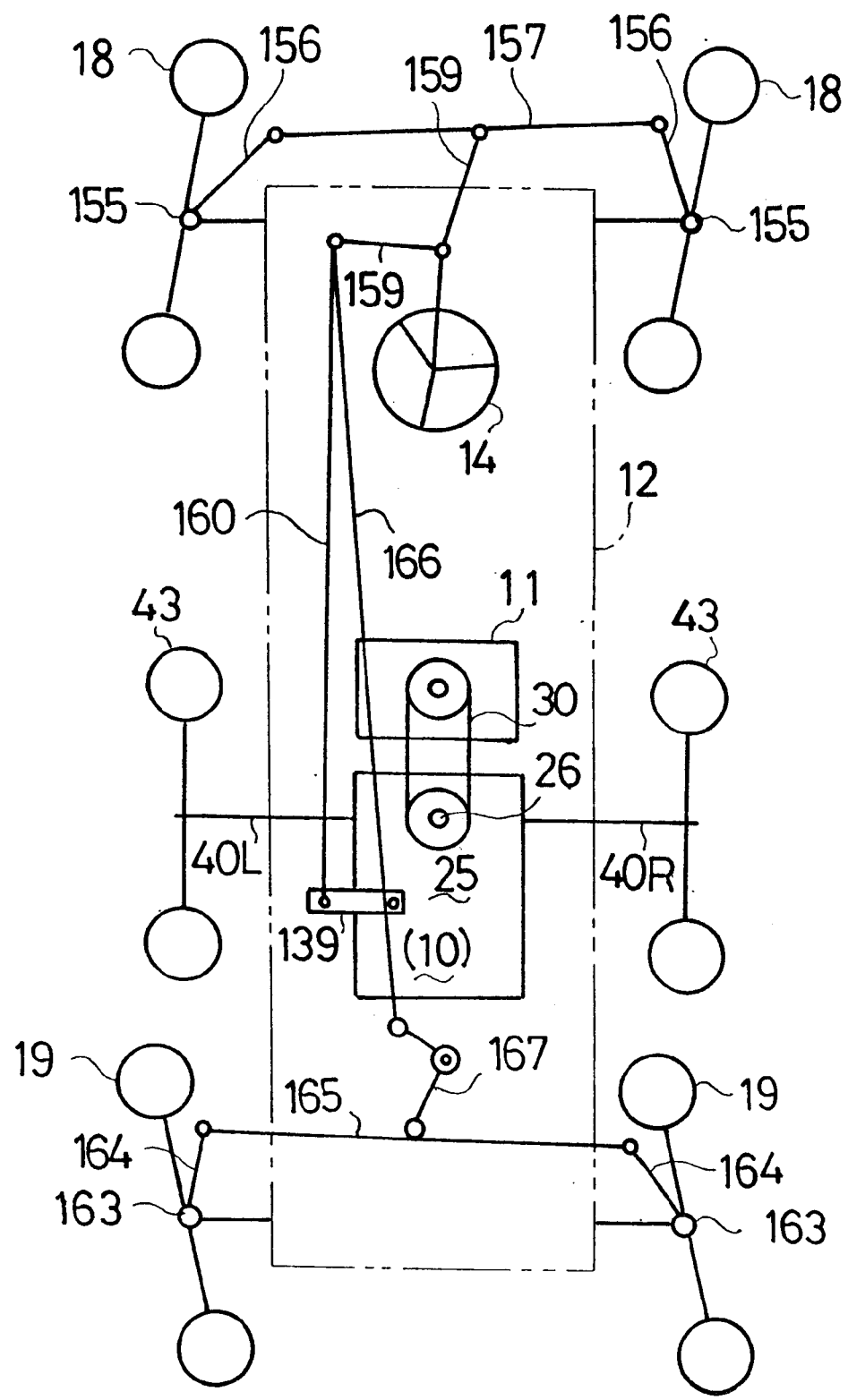
FIG. 6 is a schematic view of a six-wheel vehicle having first wheels 43 and two pair of steerable wheels 18 and 19.

It is ordinary that a pair of steerable wheels 18 which are laterally turned by manipulation of steering wheel 14 are disposed before the pair of first running wheels 43. Referring to FIG. 6, a pair of steerable wheels 19 are additionally arranged behind first running wheels 43.

Front steerable wheels 18 are supported to king pins 156 in vehicle chassis 12 before axle driving/steering unit 10, knuckle arms 156 are fixed to king pins 155, and left and right knuckle arms 156 are pivotally connected with each other through a tie rod 157. Tie rod 157 is connected to one end of pitman arm 159, and the other end thereof is connected in interlocking with a stem of steering wheel 14 through a gear.

Rear steerable wheels 19 are supported onto king pins 163 rotatably supported onto vehicle chassis 12. Knuckle arms 164 are fixed to king pins 163 and pivotally connected with each other through a tie rod 165. Tie rod 165 is connected to pitman arm 159 through a bell crank arm 167 and a connecting link 166.

Knuckle arms 156 and 164 and tie rods 157 and 165, when steering wheel 14 is fully turned, tilt at about 80° in this embodiment.

Preferably, rear steerable wheels 19 are laterally turned in the lateral opposite direction of the laterally turned front steerable wheels 18. Next, description will be given on various embodiments of a vehicle wherein the driving force of running-driving axles 40L and 40R is transmitted to other running wheels.

Figure 7:
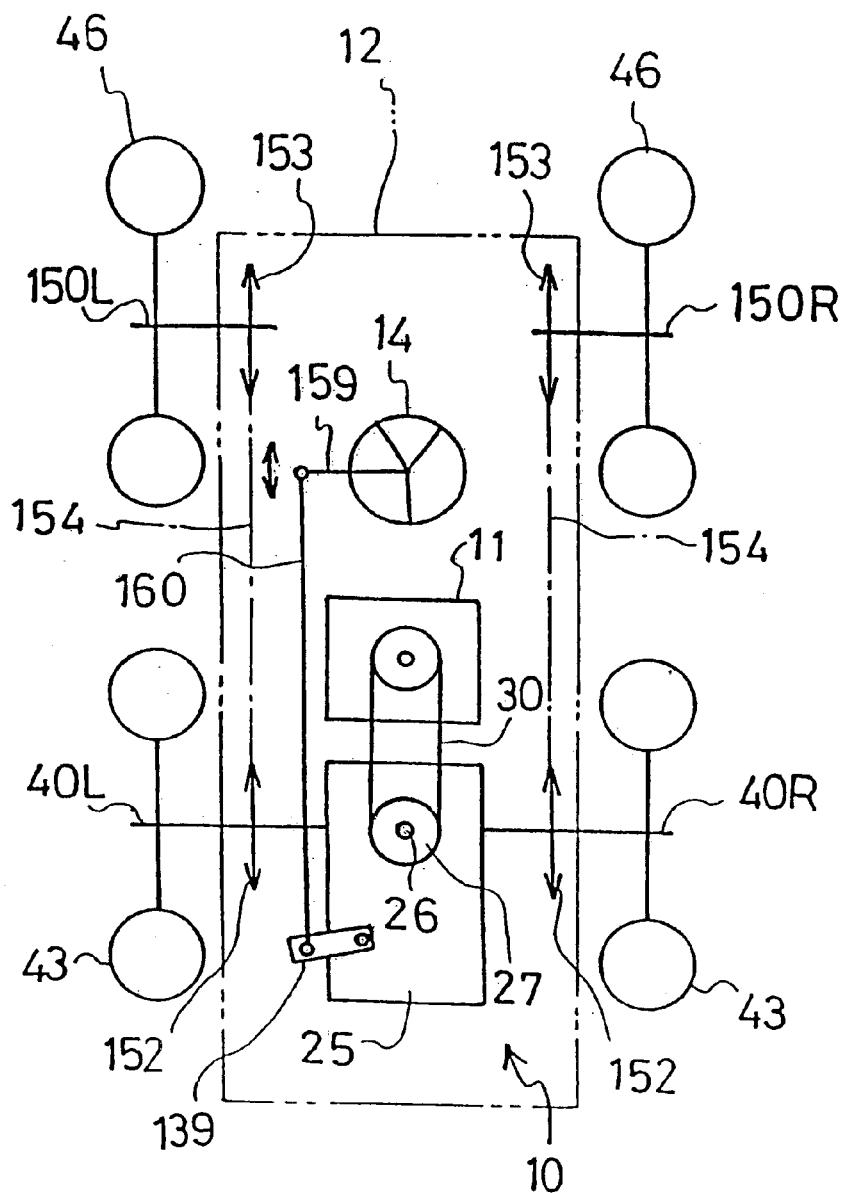
FIG. 7 is a schematic view of a four-wheel vehicle as a preferred embodiment of a multi-axle vehicle having first drive wheels 43 and second drive wheels 46 drivingly connected with each other.

Referring to FIG. 7, a pair of left and right running-driven axles 150L and 150R as the second axles are rotatably supported by vehicle chassis 12 in parallel to left and right running-driving axles 40L and 40R as axles of first running wheels (first running-driving wheels) 43. A pair of second running-driving wheels 46 are fixed onto outer ends of axles 150L and 150R.

Sprockets (or pulleys) 152 are fixed onto running-driving axles 40L and 40R, and sprockets 153, onto running-driven axles 150L and 150R, respectively, and a chain (or a belt) 154 is interposed between each sprocket 152 and each sprocket 153 on the same side of the vehicle, so as to drive running-driven axles 150L and 150R in the same direction and at the same rotary speed with running-driving axles 40L and 40R.

In such the construction, a plurality of left and right running wheels (four wheels in the embodiment of FIG. 7) are simultaneously driven in the same direction and in an equal number of rotations while the vehicle running straight forward. When steering wheel 14 is rotated, running-driving wheels 43 and 46 on the turning side of steering wheel 14 are accelerated, and opposite running-driving wheels 43 and 46 are decelerated, whereby the vehicle turns left or right. Whether the vehicle runs straight or turns, all running wheels 43 and 46 are driven so as to enable the vehicle to run effectively on rough or soft ground. Thus, the construction of this embodiment can be applied to, for example, a skid steering loader, a carrier or an amphibian vehicle. Also, second running-driving wheels 46 are driven synchronously to respective first running-driving wheels 43 so as to prevent wheels 46 from being dragged on the ground, thereby reducing the damage of the ground.

Figure 8:
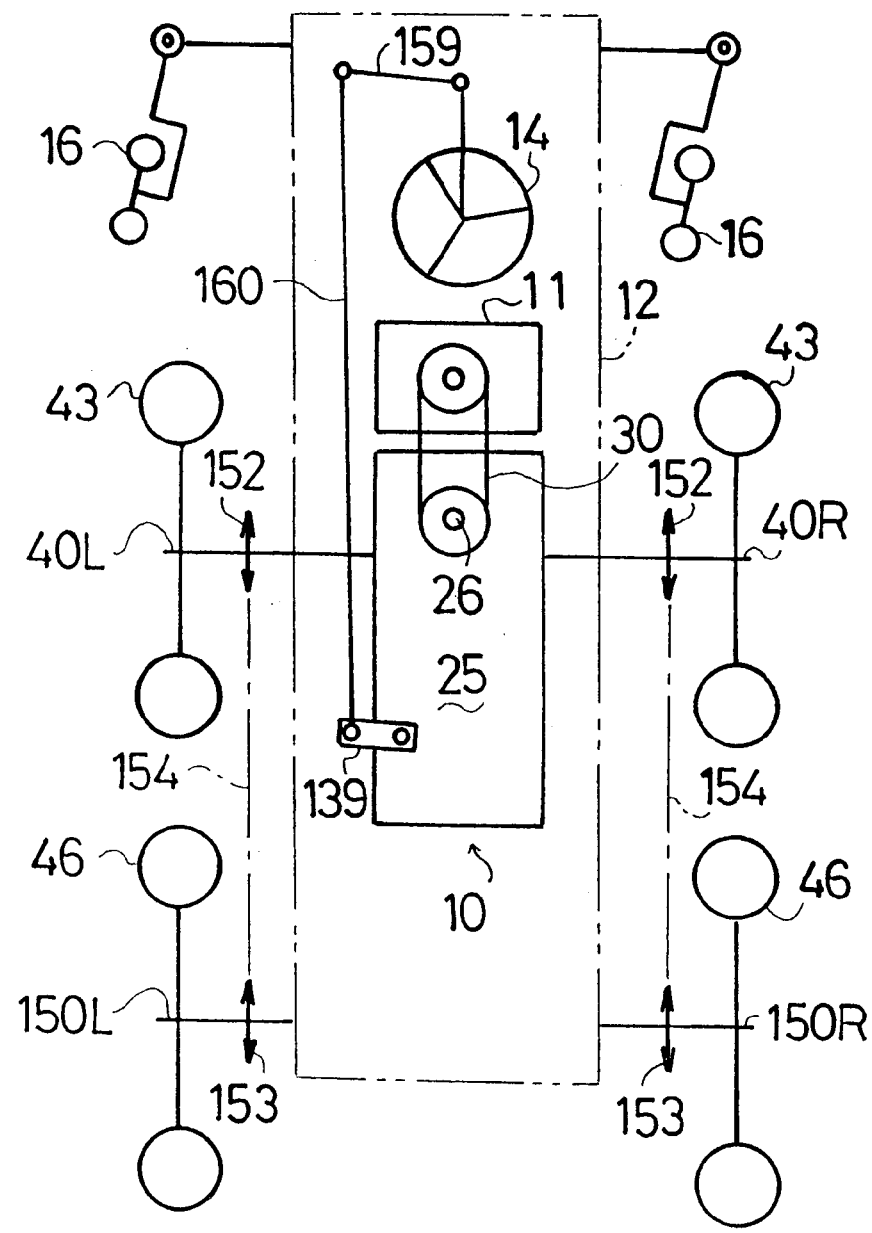
FIG. 8 is a schematic view of a six-wheel vehicle as the vehicle of FIG. 7 further provided with castors 16.
Figure 9:
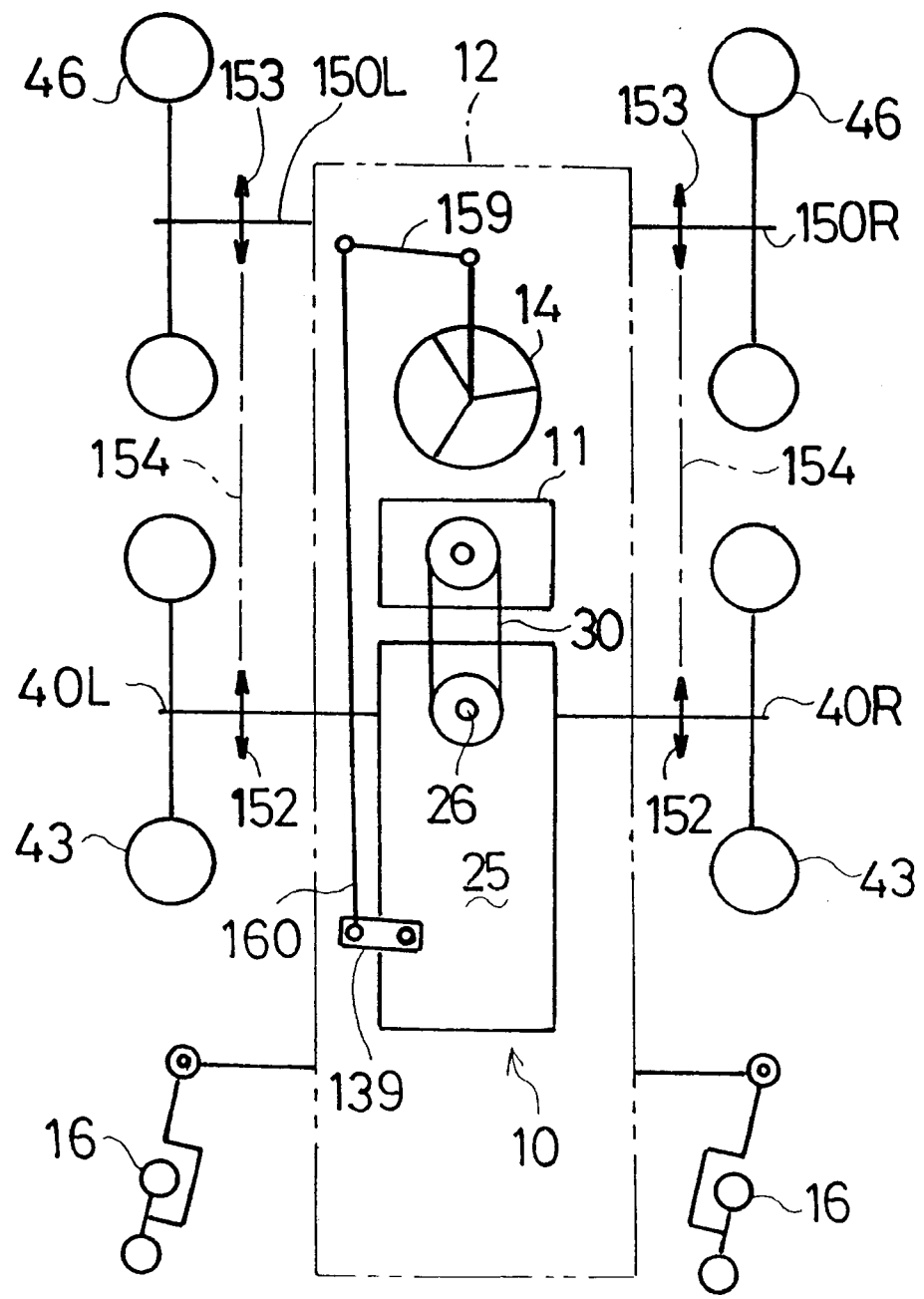
FIG. 9 is a schematic view of the six-wheel vehicle of FIG. 8, wherein castors 16 and third wheels 45 are exchanged with each other.
Figure 10:
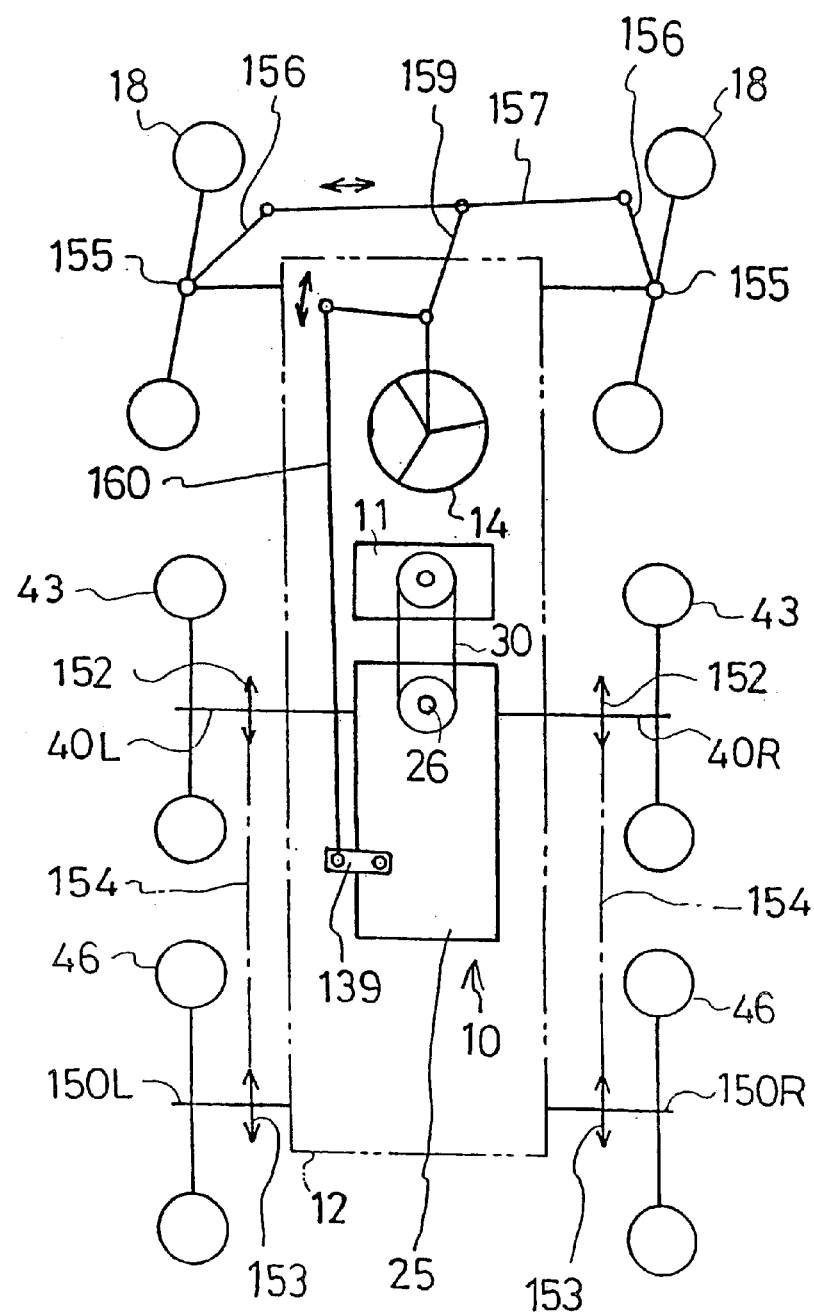
FIG. 10 is a schematic view of the six-wheel vehicle of FIG. 7, wherein steerable wheels 18 replace castors 16.

Furthermore, each of FIGS. 8–10 shows a six-wheel vehicle additionally provided with a pair of running wheels which are laterally rotated into the running direction of the vehicle during the steering of the vehicle. Referring to FIGS. 8 and 9, castors 16 are provided as such running wheels. In FIGS. 8–10, of the six running wheels, first running-driving wheels 43 are arranged at the longitudinal middle. Castors 16 serving as second running wheels and second running-driving wheels 46 serving as third running wheels are arranged before and behind first running-driving wheels 43 respectively in FIG. 8, and behind and before respectively in FIG. 9. Referring to FIG. 10, second running-driving wheels 46 are arranged behind first running-driving wheels 43, and front steerable wheels 18 turned by steering wheel 14 are before first running-driving wheels 43 similarly with FIG. 6.

In such constructions, when steering wheel 14 is rotated, the rotary speed of first and second running-driving wheels 43 and 46 on one lateral side becomes different from that of first and second running-driving wheels 43 and 46 on the other lateral side. Simultaneously, castors 16 or steerable wheels 18 are laterally turned into the running direction of the vehicle oriented by steering wheel 14. Accordingly, even when a whole length of vehicle body is made larger, the vehicle can smoothly make a small turn. Also, the wheels scarcely cause dragging while the vehicle is turning, thereby enabling the vehicle to turn without roughening a field.

Referring to FIGS. 11–20, the first running wheels attached to outer ends of respective running-driving axles 40L and 40R as output shafts of axle driving/steering unit 10 are steerable driving wheels 47 serving as running-driving wheels and also as steerable wheels laterally turned by steering wheel 14.

In this regard, steerable driving wheels 47 are supported onto king pins 163 rotatably supported onto vehicle chassis 12. Knuckle arms 164 are fixed to king pins 163 and pivotally connected with each other through a tie rod 165. Tie rod 165 is connected to pitman arm 159 through a bell crank arm 167 and a connecting link 166. Pitman arm 159 is connected to arm 139 for rotating movable swash plate 76 of steering HST 22 through connection link 161 as mentioned above.

Due to such a construction, steering wheel 14 is manipulated (turned leftward or rightward) so as to make the rotary speeds of left and right steerable driving wheels 47 driven by axle driving/steering unit 10 different from each other, and simultaneously to make both steerable driving wheels 47 laterally turn.

Figure 11:
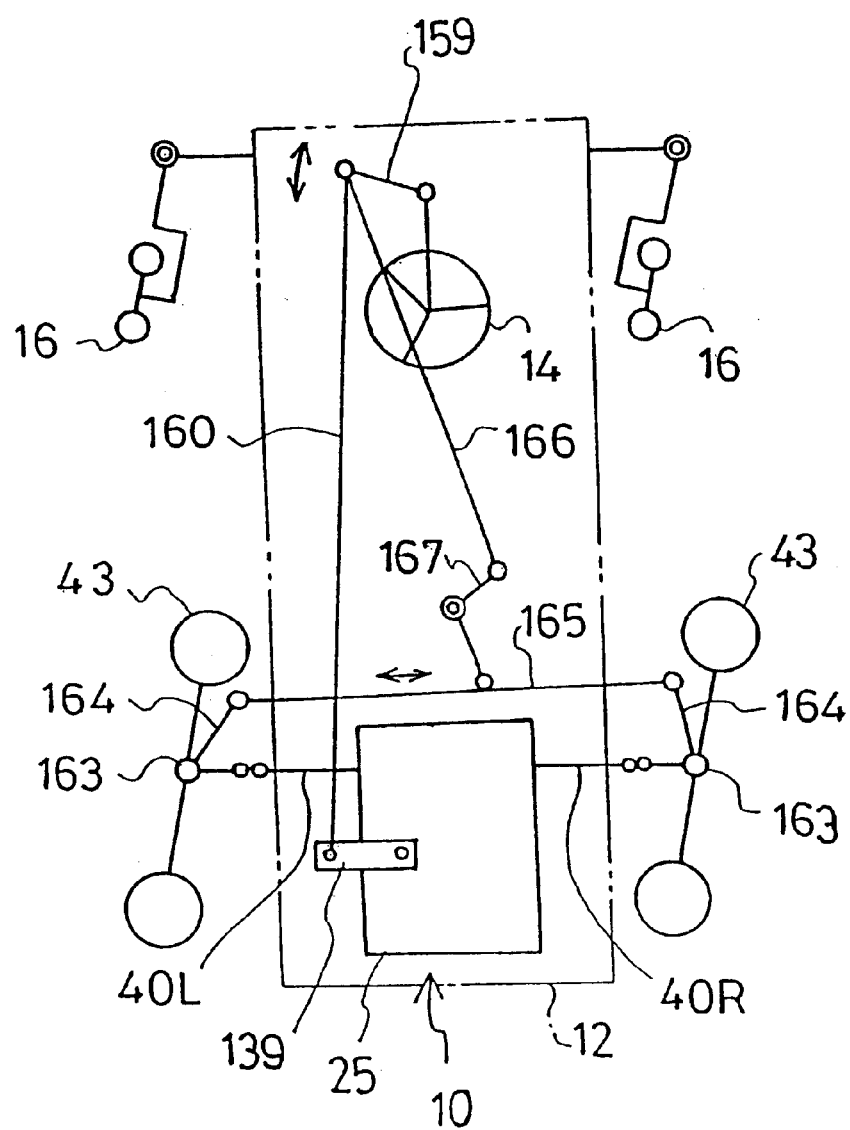
FIG. 11 is a schematic view of a four-wheel vehicle having steerable drive wheels 47 driven by axle driving/steering unit 10 and turned by manipulation of a steering wheel 14, wherein castors 16 are provided.

For an embodiment of a vehicle having such steerable driving wheels 47, firstly, FIG. 11 shows a vehicle having a pair of castors 16 before left and right steerable driving wheels 47 so as to be turnable on a small circle.

Figure 12:
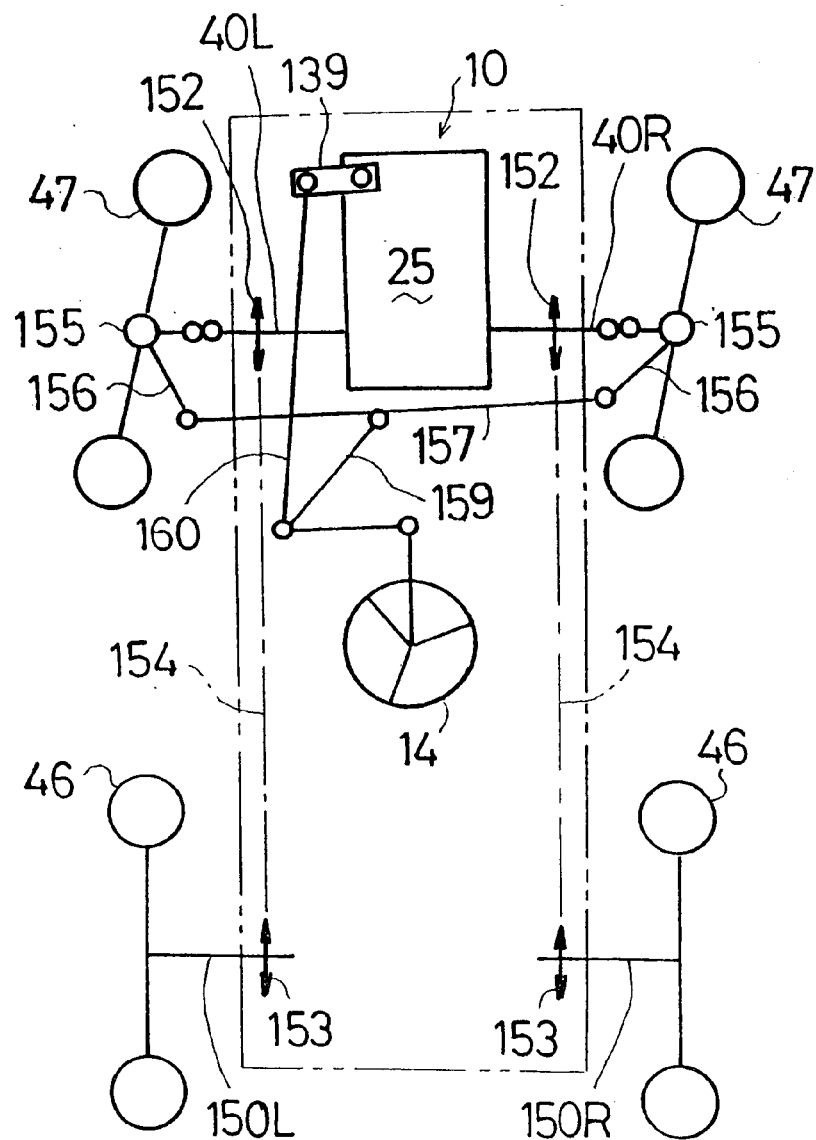
FIG. 12 is a schematic view of a four-wheel vehicle having steerable drive wheels 47, wherein second drive wheels 46 drivingly connected with steerable drive wheels 47 are provided.

The vehicle of FIG. 12 is a four-wheel vehicle having front steerable driving wheels 47 as the first running-driving wheels, and rear second running-driving wheels 46. The driving forces of left and right running-driving axles 40L and 40R onto which steerable driving wheels 47 are attached are transmitted through sprockets 152 and 153 and chains 154 to respective left and right running-driven axles 150L and 150R onto which second running-driving wheels 46.

Figure 13:
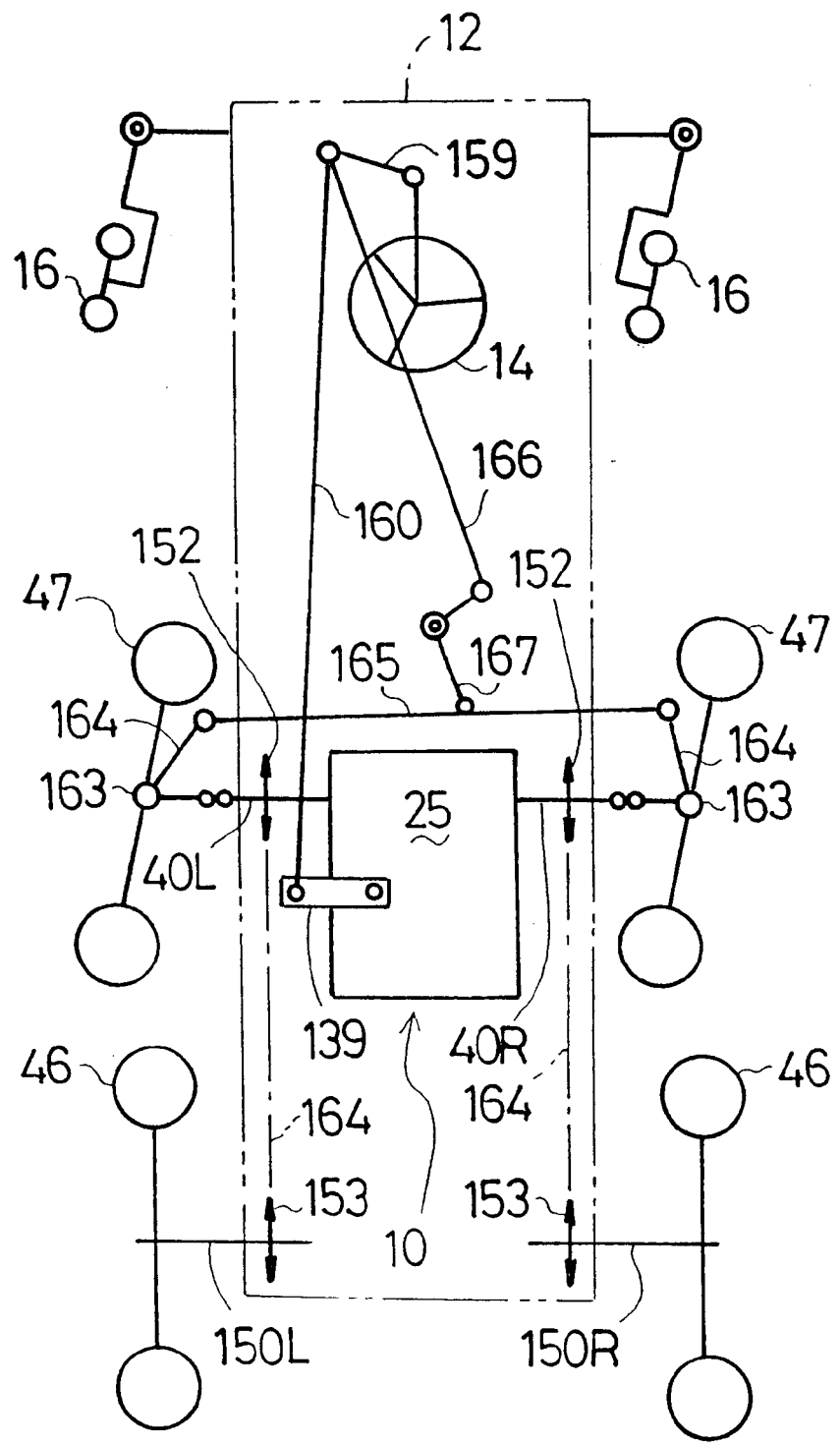
FIG. 13 is a schematic view of a six-wheel vehicle having steerable drive wheels 47 as the vehicle of FIG. 12 further provided with castors 16.

The vehicle of FIG. 13 serves as a combination of both embodiments of FIGS. 11 and 12. In other words, this is a six-wheel vehicle provided with a pair of second running-driving wheels 46, into which the driving forces of steerable driving wheels 47 as the first running-driving wheels, and a pair of castors 16. FIG. 13 shows that castors 16, steerable driving wheels 47 and second running-driving wheels 46 serve as front wheels, longitudinal middle wheels, and rear wheels, respectively. However, the positional relationship among wheels 16, 47 and 46 in the longitudinal direction of the vehicle is not limited as this.

Figure 14:
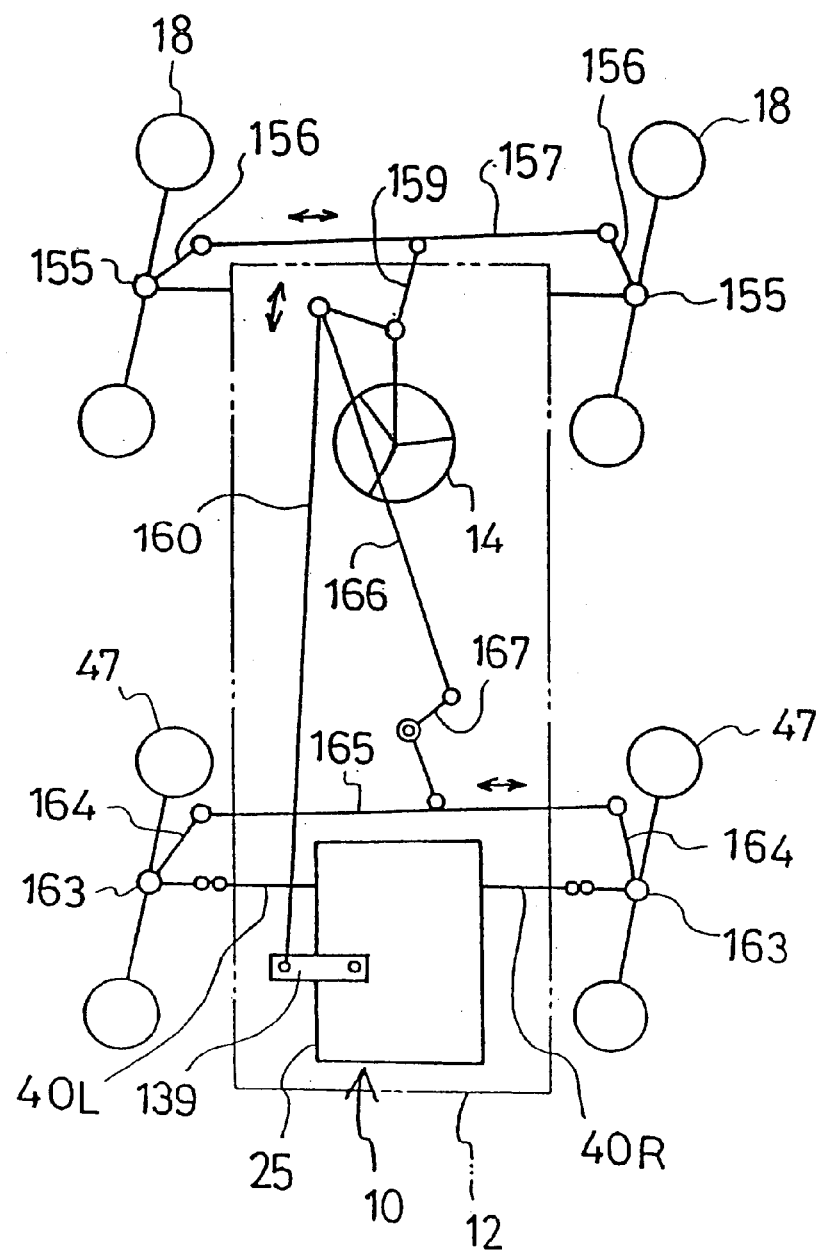
FIG. 14 is a schematic view of a four-wheel vehicle having steerable drive wheels 47, wherein steerable wheels 18 are provided.
Figure 15:
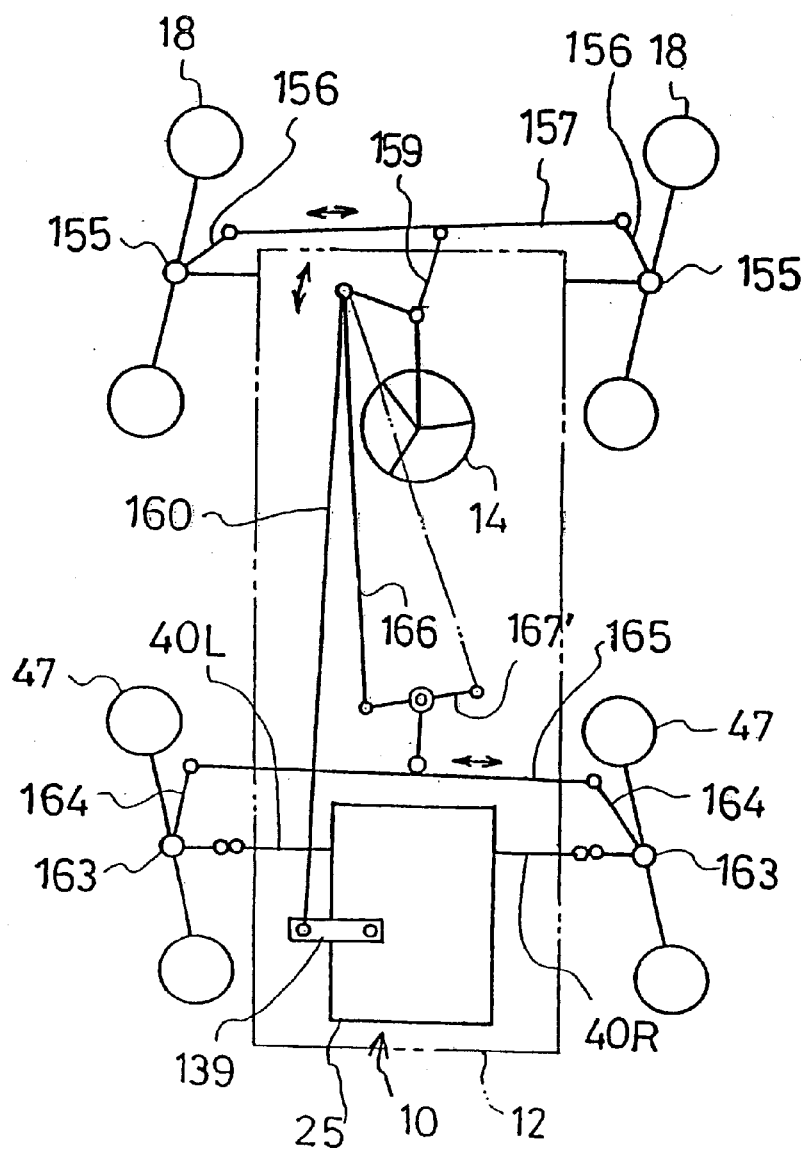
FIG. 15 is a schematic view of a four-wheel vehicle similar with that of FIG. 14, wherein the lateral turning direction of steerable drive wheels 47 in accordance with the manipulation of steering wheel 14 can be switched.

The vehicle of each of FIGS. 14 and 15 is a four-wheel vehicle wherein the pair of steerable driving wheels 47 are rear running wheels, and a pair of left and right steerable wheels 18 as shown in FIG. 6, which are laterally turned by manipulation of steering wheel 14, are front running wheels.

Referring to FIG. 14, the lateral turning directions of steerable driving wheels 47 and steerable wheels 18 during the rotation of steering wheel 14 coincide with each other. In FIG. 15, they are opposite, that is, steerable wheels 18 are laterally turned to the side of rotated steering wheel 14 and steerable driving wheels 47 are laterally turned oppositely to the side of rotated steering wheel 14.

Especially, referring to FIG. 15, a pivotal joint point between a T-like shaped bell crank arm 167' and connection link 166 can be positionally changed so as to change a lateral turning direction of rear steerable driving wheels 47 with respect to the rotating direction of steering wheel 14, according to different running conditions. When the vehicle is to run fast or is to make a turn while keeping its posture in parallel, connection link 166 is disposed along a phantom line shown in FIG. 15 to be connected to arm 167', thereby constituting a linkage which is similar with that consisting of connection link 166 and bell crank arm 167 of the embodiment shown in FIG. 14, so that all front and rear running wheels 18 and 47 can be moved substantially in parallel, whereby the road or field is prevented from being roughened, the turning radius can be diminished and side slip can be prevented. When the vehicle is to make U-turn, for example, while farming on a narrow field, connection link 166 is disposed along a full line shown in FIG. 6 to be connected to arm 167', so that rear steerable driving wheels 47 are turned laterally in opposite to the lateral turning direction of front steerable wheels 18, whereby the vehicle can make U-turn with a greatly reduced radius without a large rotational degree of steering wheel 14.

It should be noted that, in both the embodiments shown in FIGS. 14 and 15, the lateral turning angles of front and rear running wheels 18 and 47 are determined in correspondence to the difference between the rotary speeds of left and right running-driving axles 40L and 40R driven by axle driving/steering unit 10.

Figure 16:
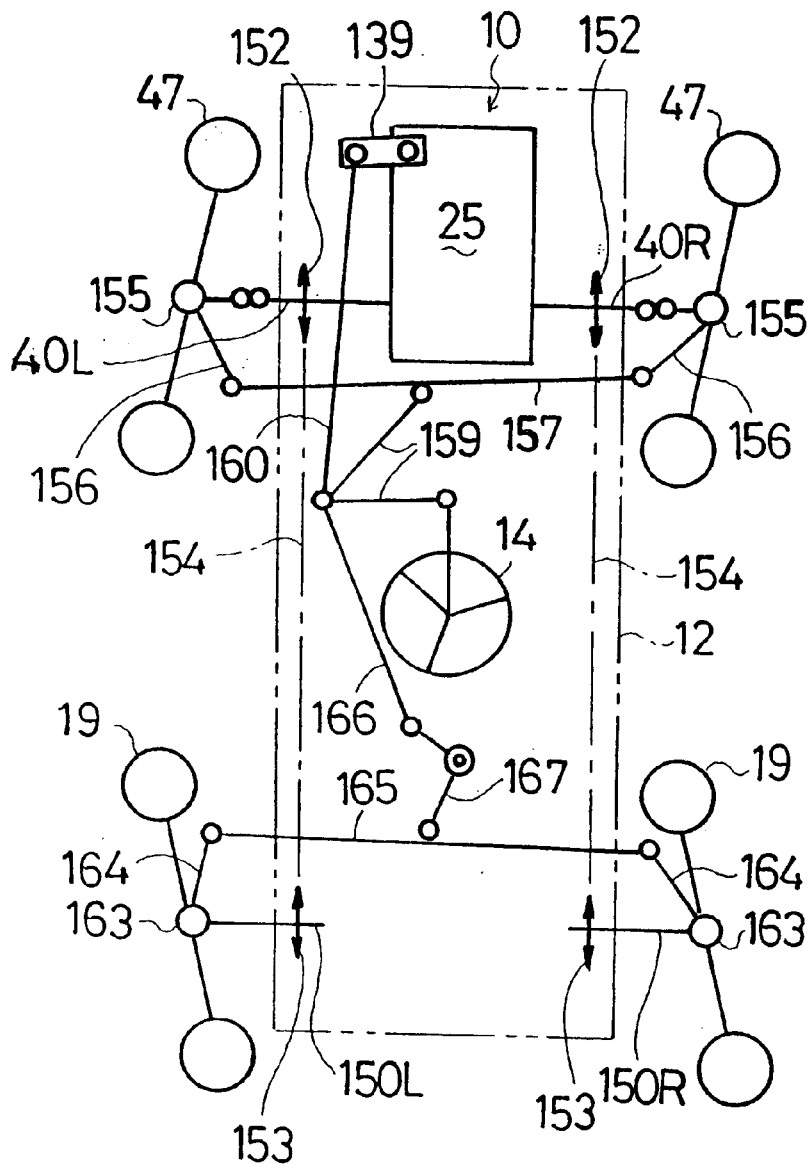
FIG. 16 is a schematic view of a four-wheel vehicle having steerable drive wheels 47, wherein steerable wheels 19 also serving as second drive wheels 46 are provided.

The vehicle of FIG. 16 is a four-wheel vehicle, wherein the pair of steerable driving wheels 47, which become different from each other in their rotary speeds and are laterally turned during the manipulation of steering wheel 14, serve as front running wheels, and a pair of steerable wheels 19, which are connected to pitman arm 159 through connection link 166 and so on as shown in FIG. 6, serve as rear running wheels. Additionally, axles of steerable wheels 19 are running-driven axles 150L and 150R to which driving forces are transmitted from running-driving axles 40L and 40R of steerable driving wheels 47 through sprockets 152 and 153 and chains 154. In brief, steerable wheels 19 also serve as second running-driving wheels 46.

Accordingly, steering wheel 14 is rotated so as to make all front and rear running wheels 47 and 19 differ in their rotary speeds between left running wheels 47 and 19 and right running wheels 47 and 19, and laterally rotate, whereby the vehicle turns left or right. Preferably, rear steerable wheels 19 are laterally turned oppositely to the lateral turning direction of front steerable driving wheels 47 which are laterally turned to the side of rotated steering wheel 14 (into the running direction of the vehicle).

Figure 17:
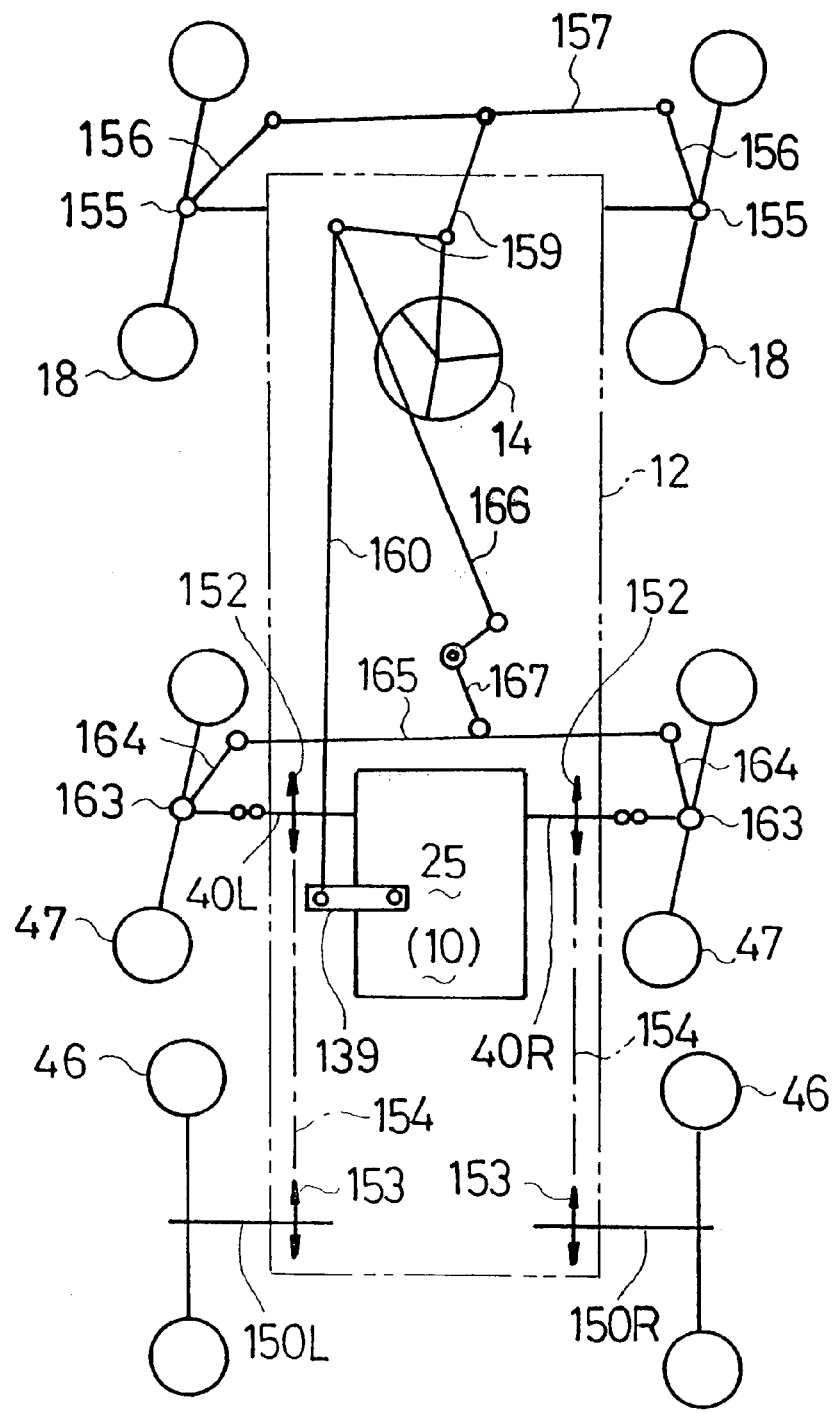
FIG. 17 is a schematic view of a six-wheel vehicle having steerable drive wheels 47, steerable wheels 18 and second drive wheels 46.

The vehicle of FIG. 17 is a six-wheel vehicle, wherein a pair of second running-driving wheels 46 are provided as rearmost running wheels in addition to four steerable running wheels 18 and 47 arranged as shown in FIG. 14 (in this case, steerable driving wheels 47 are laterally turned oppositely to the lateral turning direction of steerable wheels 18 during rotation of steering wheel 14). Driving forces are transmitted from running-driving axles 40L and 40R of steerable driving wheels 47 to running-driven axles 150L and 150R of second running-driving wheels 46 through sprockets 152 and 153 and chains 154.

Figure 18:
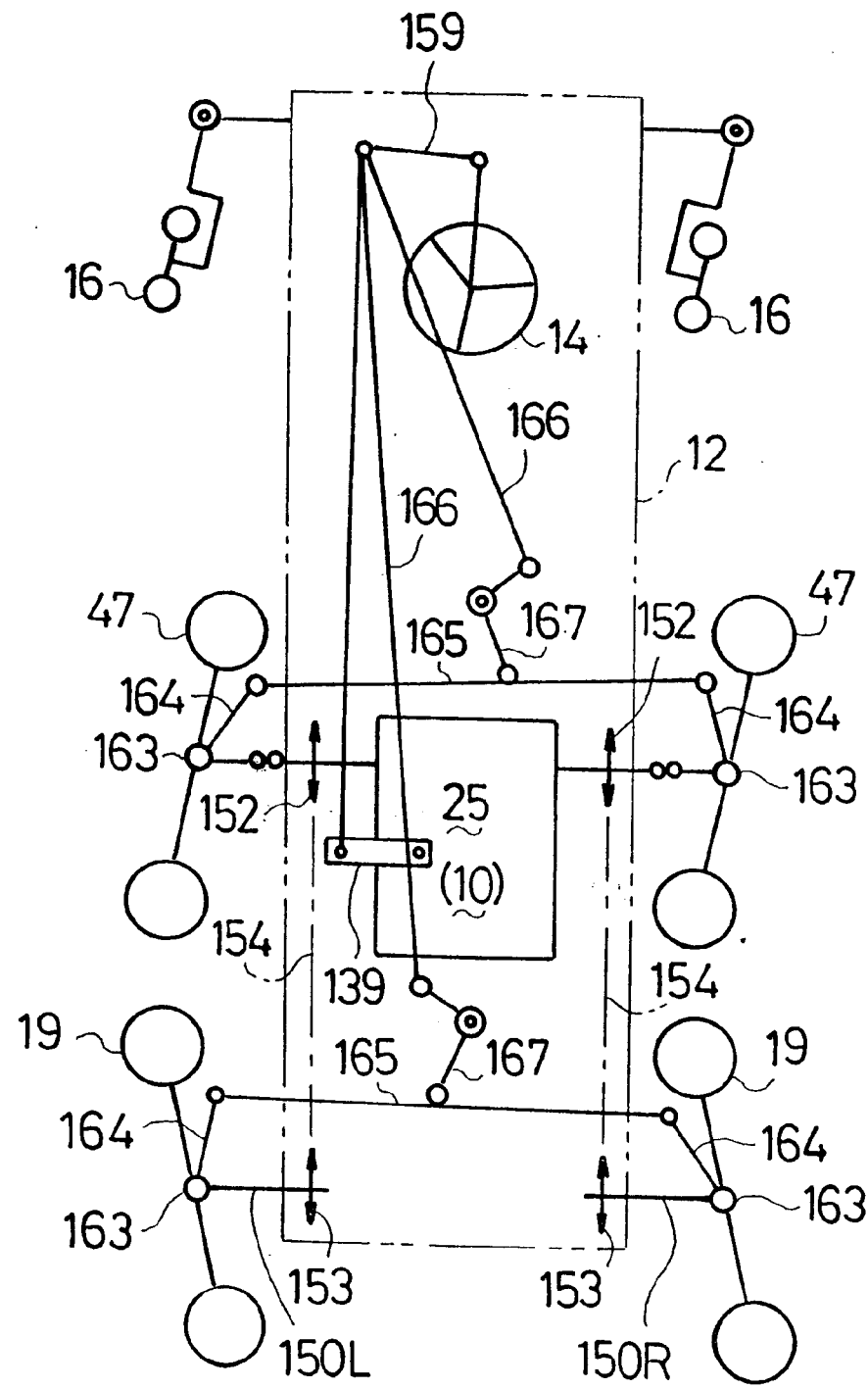
FIG. 18 is a schematic view of a six-wheel vehicle having steerable drive wheels 47, castors 16, and steerable wheels 19 also serving as second drive wheels 46.
Figure 19:
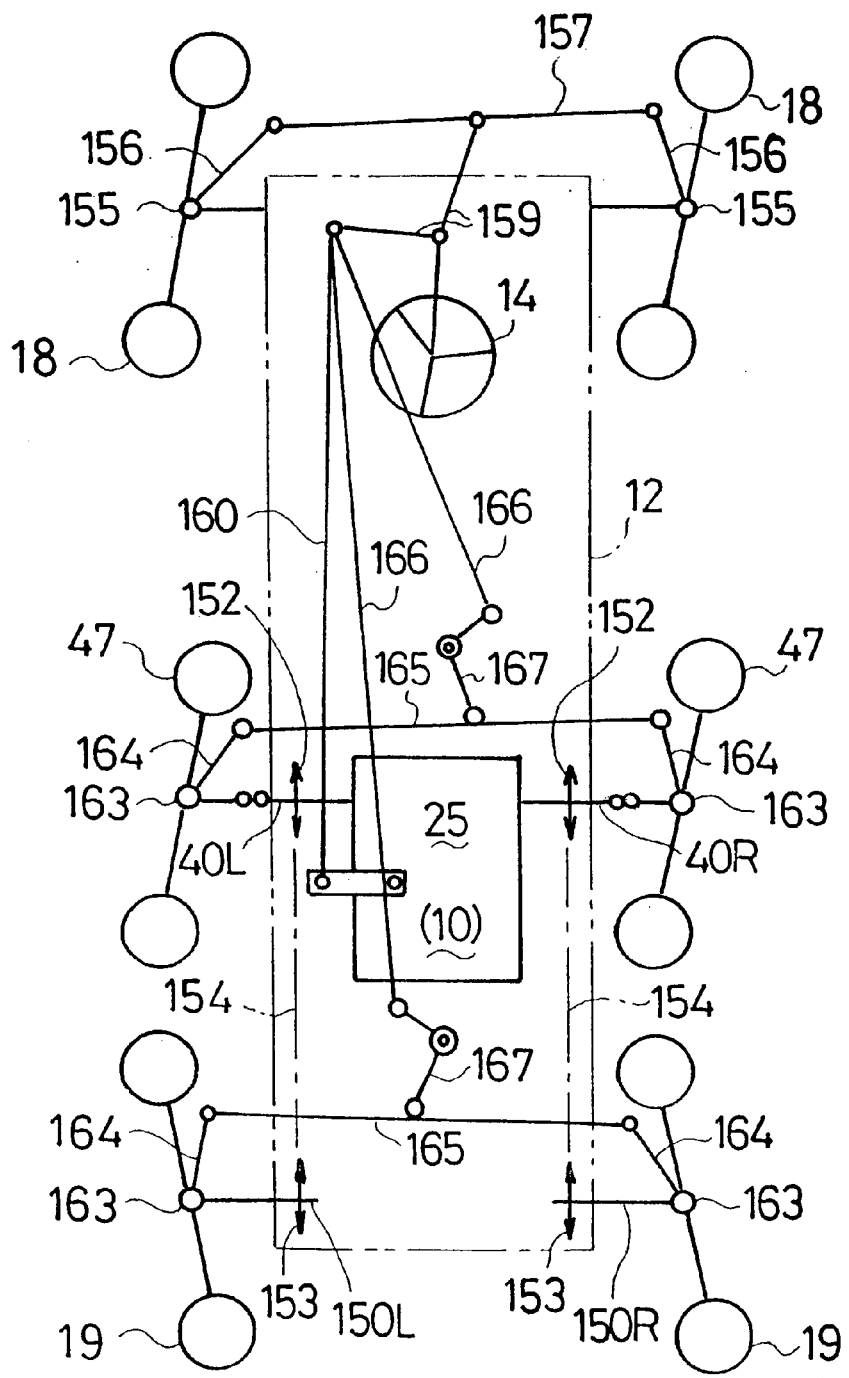
FIG. 19 is a schematic view of the six-wheel vehicle of FIG. 18, wherein steerable wheels 18 replace castors 16.

The vehicle of each of FIGS. 18 and 19 is a six-wheel vehicle having the arrangement of running wheels 47 and 19 (in this case, steerable wheels 19 are laterally turned oppositely to the lateral turning direction of steerable driving wheels 47 during rotation of steering wheel 14) as shown in FIG. 16. In addition to running wheels 47 and 19, for serving as frontmost running wheels, the vehicle of FIG. 18 is provided with a pair of castors 16, and that of FIG. 19 is provided with a pair of steerable wheels 18 steered by steering wheel 14.

Figure 20:
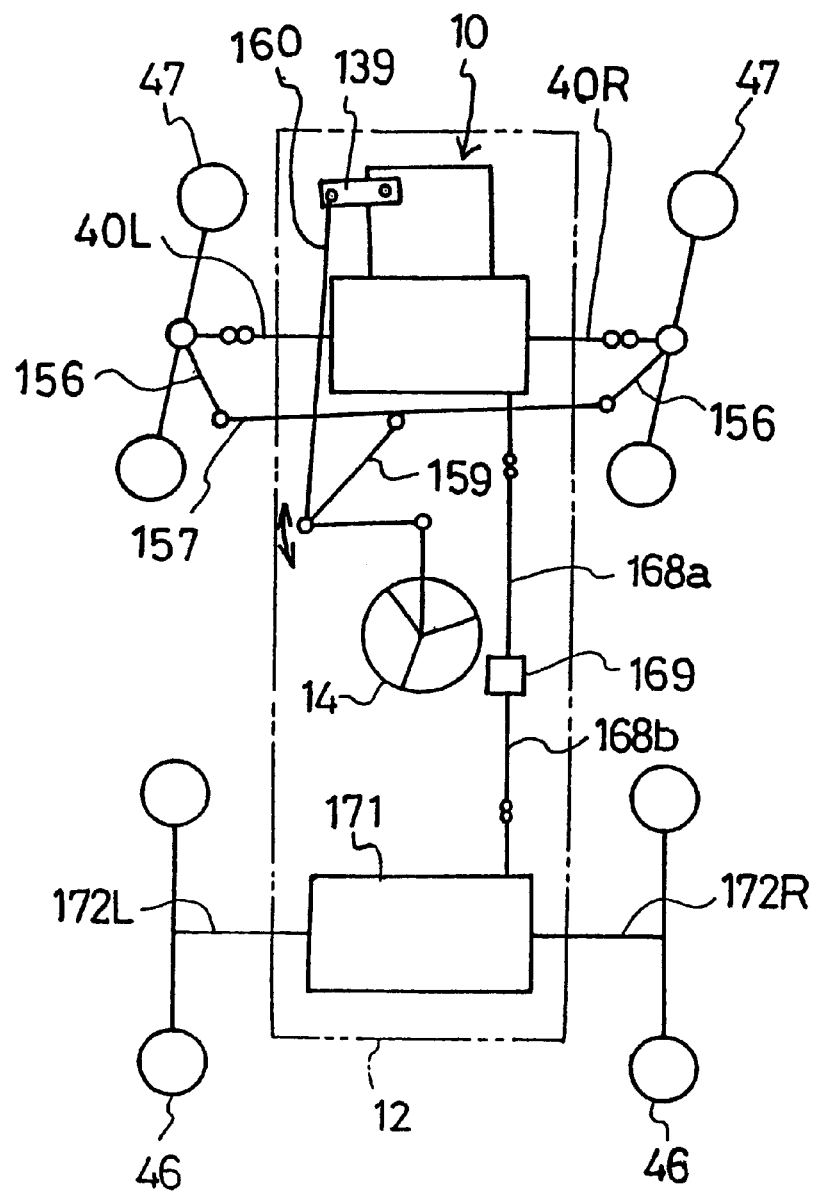
FIG. 20 is a schematic view of a four-wheel vehicle having steerable drive wheels 47 and second drive wheels 46, wherein second drive wheels 46 are drivingly connected with steerable drive wheels 47 through another transmitting structure.

Finally, description will be given on a vehicle of FIG. 20 having another transmitting structure interposed between running-driving axles 40L and 40R as output shafts of axle driving/steering unit 10 and another pair of axles.

A pair of left and right running-driven axles 172L and 172R are rotatably supported by vehicle chassis 12 in parallel to left and right running-driving axles 40L and 40R onto which steerable driving wheels 47 are attached (in this case, running-driven axles 172L and 172R are disposed behind running-driving axles 40L and 40R). A differential unit 171 is disposed so as to differentially connect left and right running-driven axles 172L and 172R with each other. Onto the outer ends of running-driven axles 172L and 172R are fixed second running-driving wheels 46. Between motor shaft 54 of main driving HST 21 and an input shaft of differential unit 171 are interposed transmission shafts 168a and 168b in series which are differentially connected with each other through a center differential unit 169, so as to drive second running-driving wheels 46. Steering wheel 14 is operatively connected with arm 139 for turning movable swash plate 76 of steering HST 22 through pitman arm 159 and connection link 160.

In such the construction, when steering wheel 14 is rotated, left and right steerable running wheels 47 serving as front running wheels are laterally turned conforming with a rotational angle of steering wheel 14 and simultaneously, they are given a difference of rotary speed therebetween through steering HST 22 driven by the rotational manipulation of steering wheel 14. Furthermore, second running-driving wheels 46 serving as rear running wheels are driven substantially in synchronism with the driving of steerable driving wheels 47, thereby enabling the vehicle to travel steadily while exactly applying the driving force onto the ground without dragging of rear running wheels 46.

The above-mentioned construction of the vehicle according to the present invention is applicable to such a vehicle as a tractor, a riding mower, a snow removing vehicle and an amphibian motorcar.

Although several embodiments have been described, they are merely exemplary of the invention and not to be construed as limiting, the invention being defined solely by the appended claims.

What is claimed is:

1. A multi-wheel vehicle comprising:
    a pair of first running wheels serving as driving wheels;
    a pair of second running wheels disposed before or behind said pair of first running wheels, wherein said pair of second running wheels are laterally turned into the traveling direction of said vehicle;
    a pair of third running wheels disposed before or behind said pair of first running wheels;
    a prime mover:
    a speed change operation means;
    a steering operation means;
    a transmission drivingly connected with said prime mover; and
    a pair of running-driving axles onto which said respective first running wheels are attached, wherein said transmission applies composite force of first equal rotational forces in the same directions and second equal rotational forces in opposite directions onto said pair of first running wheels, wherein said speed change operation means is manipulated so as to regulate the direction and magnitude of said first rotational forces, and wherein said steering operation means is manipulated so as to regulate the direction and magnitude of said second rotational forces.

2. The multi-wheel vehicle as set forth in claim 1, wherein said second running wheels are steerable wheels interlocking with said steering operation means.

3. The multi-wheel vehicle as set forth in claim 1, wherein said second running wheels are castors.

4. The multi-wheel vehicle as set forth in claim 1, wherein said pair of second running wheels are disposed before said pair of first running wheels, and said pair of third running wheels are disposed behind said pair of first running wheels.

5. The multi-wheel vehicle as set forth in claim 1, wherein said pair of second running wheels are disposed behind said pair of first running wheels, and said pair of third running wheels are disposed before said pair of first running wheels.

6. The multi-wheel vehicle as set forth in claim 1, further comprising:
    a pair of second axles disposed in parallel to said pair of running-driving axles, wherein said third running wheels are attached onto said respective second axles.

7. The multi-wheel vehicle as set forth in claim 6, wherein driving force of said running-driving axles is transmitted to said pair of second axles.

8. The multi-wheel vehicle as set forth in claim 7, wherein a pair of power transmission mechanisms are interposed between said respective running-driving axles and said respective second axles so as to rotate said pair of second axles in the same rotational direction of said first running-driving axles.

9. A multi-wheel vehicle comprising:
    a pair of first running wheels serving as driving wheels;
    a pair of castors as second running wheels disposed before or behind said pair of first running wheels;
    a pair of third running wheels disposed before or behind said pair of first running wheels;
    a prime mover:
    a speed change operation means;
    a steering operation means;
    a transmission drivingly connected with said prime mover; and a pair of running-driving axles onto which said respective first running wheels are attached, wherein said transmission applies composite force of first equal rotational forces in the same directions and second equal rotational forces in opposite directions onto said pair of first running wheels, wherein said speed change operation means is manipulated so as to regulate the direction and magnitude of said first rotational forces, and wherein said steering operation means is manipulated so as to regulate the direction and magnitude of said second rotational forces.

10. The multi-wheel vehicle as set forth in claim 9, wherein said pair of castors are disposed before said pair of first running wheels, and said pair of third running wheels are disposed behind said pair of first running wheels.

11. The multi-wheel vehicle as set forth in claim 9, wherein said pair of castprs are disposed behind said pair of first running wheels, and said pair of third running wheels are disposed before said pair of first running wheels.

12. The multi-wheel vehicle as set forth in claim 9, further comprising:
   a pair of second axles disposed in parallel to said pair of running-driving axles.

13. The multi-wheel vehicle as set forth in claim 12, wherein driving force of said running-driving axles is transmitted to said pair of second axles.

14. The multi-wheel vehicle as set forth in claim 13, wherein a pair of power transmission mechanisms are interposed between said respective running-driving axles and said respective second axles so as to rotate said pair of second axles in the same rotational direction of said first running-driving axles.

15. A running vehicle comprising:
   a steering operation tool;
   a pair of running-driving axles;
   a first pair of running wheels drivingly connected with said pair of running-driving axles;
   a first differential unit interposed between said pair of running-driving axles;
   a first hydrostatic transmission for transmitting a driving force to said first differential unit;
   a pair of steering output shafts;
   a second differential unit interposed between said pair of steering output shafts;
   a second hydrostatic transmission for transmitting a driving force to said second differential unit, wherein said second hydrostatic transmission operationally interlocks with said steering operation tool so that the output speed and direction of said second hydraulic transmission is changed by manipulation of said steering operation tool;
   a first drive train interposed between one of said steering output shafts and one of said running-driving axles;
   a second drive train interposed between the other steering output shaft and the other running-driving axle for transmitting rotating effort to said other running-driving axle in the opposite direction to said first drive train;
   a pair of running-driven axles disposed in either front of or in rear of said first pair of running-driving axles;
   a second pair of running wheels drivingly connected with said pair of running-driven axles; and
   a pair of power transmission mechanisms, each of said power transmission mechanisms being interposed between said running-driving axles and said running-driven axles arranged on each side of said vehicle, so as to rotate said pair of running-driven axles in the same rotational direction as that of said running-driving axles.

* * * * *

UNITED STATES PATENT AND TRADEMARK OFFICE
CERTIFICATE OF CORRECTION

PATENT NO. : 6,554,085 B2
DATED : April 29, 2003
INVENTOR(S) : Toshiyuki Hasegawa It is certified that error appears in the above-identified patent and that said Letters Patent is hereby corrected as shown below:

Column 13,
Line 17, "castprs" should read -- castors --.

Signed and Sealed this

Twenty-first Day of June, 2005

JON W. DUDAS
*Director of the United States Patent and Trademark Office*